United States Patent
Stiles et al.

(10) Patent No.: US 12,367,219 B2
(45) Date of Patent: Jul. 22, 2025

(54) ENTITY RESOLUTION IN GENEALOGICAL DATABASES

(71) Applicant: Ancestry.com Operations Inc., Lehi, UT (US)

(72) Inventors: Ian Stiles, Salem, UT (US); Eugene David Greenwood, Orem, UT (US); Donald Bernard Curtis, Highland, UT (US); Rey Robert Furner, Lindon, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 0 days.

(21) Appl. No.: 18/652,044

(22) Filed: May 1, 2024

(65) Prior Publication Data
US 2024/0370463 A1   Nov. 7, 2024

Related U.S. Application Data

(60) Provisional application No. 63/499,544, filed on May 2, 2023.

(51) Int. Cl.
*G06F 7/00* (2006.01)
*G06F 16/28* (2019.01)

(52) U.S. Cl.
CPC ................. *G06F 16/285* (2019.01)

(58) Field of Classification Search
CPC .................................... G06F 16/285
USPC .................. 707/600–899; 709/738
See application file for complete search history.

(56) References Cited

U.S. PATENT DOCUMENTS

2015/0242406 A1\* 8/2015 Singh ............... G06F 16/27
707/723

\* cited by examiner

*Primary Examiner* — Isaac M Woo
(74) *Attorney, Agent, or Firm* — Keller Preece PLLC

(57) ABSTRACT

Systems, methods, and computer-program products for entity resolution are disclosed. Entity resolution embodiments include receiving tree data from each of a pair of entities, extracting and/or aggregating feature vectors or metric functions therefrom, and generating similarity scores between the pair of entities. The similarity scores may be weighted using machine-learned weights. The weighted similarity scores are used to generate a combinatorial probability score accounting for combined likelihoods of field values between the pair of entities. A classification of the pair of entities is performed based on the combinatorial probability score, with a genealogical database modified based on the classification.

20 Claims, 11 Drawing Sheets

ENTITY RESOLUTION IN GENEALOGICAL DATABASES

CROSS REFERENCE TO RELATED APPLICATIONS

This application claims priority to, and the benefit of, U.S. Provisional Patent Application No. 63/499,544, titled ENTITY RESOLUTION IN GENEALOGICAL DATABASES, filed on May 2, 2023. The aforementioned application is hereby incorporated by reference in its entirety.

FIELD

The disclosed embodiments relate to systems, methods, and/or computer-program products configured for entity resolution, particularly in genealogical databases.

BACKGROUND

A large-scale database such as user profile and genetic database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Further, in certain genealogical or family history databases, ancestor data is stored in trees which contain one or more persons or individuals. Trees may also include intra-tree relationships which indicate the relationships between the various individuals within a certain tree. In many cases, persons in one tree may correspond to persons in other trees, as users have common ancestors with other users. One challenge in maintaining genealogical databases has been entity resolution, which refers to the problem of identifying and linking different manifestations of the same real-world object.

For example, many manifestations of the same person may appear across multiple trees. This problem arises due to discrepancies between different historical records, discrepancies between historical records and human accounts, and discrepancies between different human accounts. For example, different users having a common ancestor may have different opinions as to the name, date of birth, and place of birth of that ancestor. The problem becomes particularly prevalent when large amounts of historical documents are difficult to read, causing a wide range of possible ancestor data.

In view of the foregoing, there is a need for improved entity-resolution approaches.

SUMMARY

This disclosure describes one or more embodiments of systems, methods, and non-transitory computer readable storage media that provide benefits and/or solve one or more problems in the art. For instance, the disclosed systems provide a new method for resolving entities in genealogical databases and updating such databases to reflect resolved entities, such as tree persons. To achieve entity resolution with genealogical databases, the disclosed systems can generate combinatorial probability scores by comparing tree data extracted from two different entities. As part of determining the combinatorial probability scores, the disclosed systems can determine similarity scores between two entities according to score components that include a matching score component, a different score component, and a lacking score component. In some cases, the disclosed systems apply respective weights to the score components using machine-learned weights.

BRIEF DESCRIPTION OF THE DRAWINGS

This disclosure describes one or more embodiments of the invention with additional specificity and detail by referencing the accompanying figures. The following paragraphs briefly describe those figures, in which.

Figure 1:
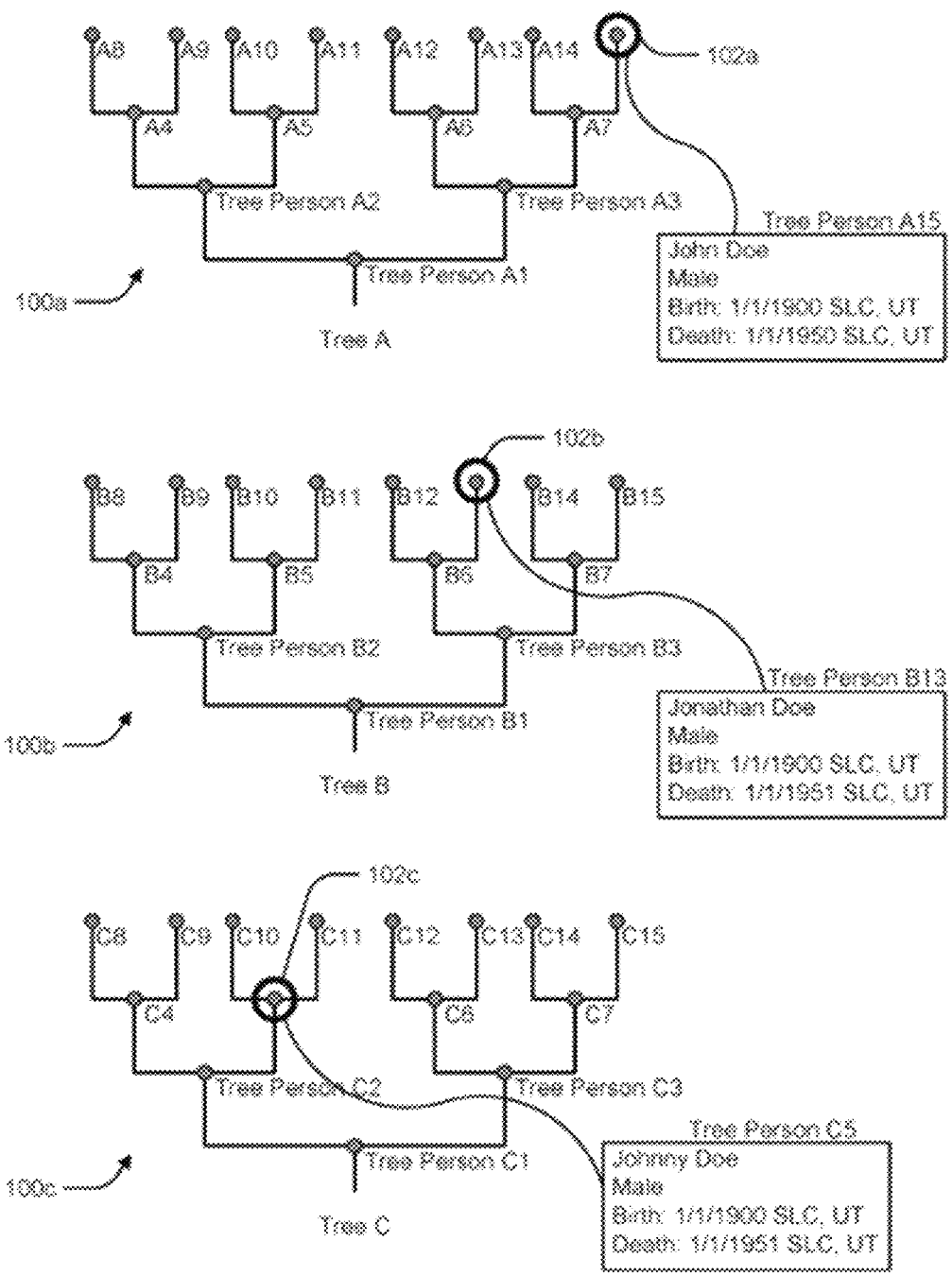
FIG. 1 illustrates example genealogical trees for one or more genealogical databases in accordance with one or more embodiments.

The drawing figures are not necessarily drawn to scale, but instead are drawn to provide a better understanding of the components, and are not intended to be limiting in scope, but to provide exemplary illustrations. The drawing figures, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and various ways in which it may be practiced. The figures illustrate exemplary configurations of systems and methods for entity resolution, and in no way limit the structures, configurations, or functions of systems and methods for entity resolution, and components thereof, according to the present disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A. Introduction

Although the embodiments of the disclosure are adapted for providing systems and methods for entity resolution, it will be appreciated that the principles of the disclosure may be adapted to any suitable application of genealogical and/or genetic research, exploration, organization, and/or visualization.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed, but on the contrary, the intention covers all modifications, alternative constructions, combinations, and equivalents falling within the spirit and scope of the disclosure. Unless a term is defined in this disclosure to possess a described meaning, there is no intent to limit the meaning of such term, either expressly or indirectly, beyond its plain or ordinary meaning.

Reference characters are provided in the claims for explanatory purposes only and are not intended to limit the scope of the claims or restrict each claim limitation to the element in the drawings and identified by the reference character.

For ease of understanding the disclosed embodiments of systems and methods for entity resolution, certain modules and features are described independently. The modules and features may be synergistically combined in embodiments to provide an entity-resolution system, method, and/or computer-program product.

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed entity-resolution systems (or methods) for purposes of illustration only. One skilled in the art will readily recognize from the following description that alternative embodiments of the structures and methods illustrated herein may be employed without departing from the principles described herein.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

B. Embodiments of Entity-Resolution Systems and Methods

Embodiments of entity-resolution systems and methods address shortcomings in the art by providing an improved entity resolution approach, particularly for genealogical databases. It has been found that existing entity-resolution approaches are limited by the computation cost of such approaches, as these approaches frequently require the use of multiple decision trees and averaging of results. This requires multiple passes through field features, and is as a result several times slower than a single pass, requiring a correspondingly large number of resources. Revision costs, likewise, are staggeringly large in certain databases such as genealogical databases, where updating the code related to fields, such as adding a new field to compare, can result in changing and reprocessing tens of billions of tree persons.

As seen in FIG. 1, trees 100a-c each have similar individuals 102a-c according to an embodiment of the present disclosure. Trees 100a-c are also denoted as Trees A, B, and C, respectively. Trees A, B, and C may be owned by, created by, and/or used by Tree Persons A1, B1, and C1, or by some other users unrelated to persons in Trees A, B, and C. In some embodiments, it may be determined that Tree Person A15 (named "John Doe"), Tree Person B13 (named "Jonathan Doe"), and Tree Person C5 (named "Johnny Doe") correspond to the same real-life individual based on their similarity.

Although a user of Tree A may understand Tree Person A15 to be John Doe, it may be beneficial that a user to become aware of the information, such as images, records, stories, or other information, discovered or contributed by the users of Trees B and C, who understand John Doe to have a differently spelled name and a different date of death. Similarly, users of Trees B and C may benefit to know of alternate spellings and dates of death for Tree Persons B13 and C5, whom they understand to be Jonathan Doe and Johnny Doe. Therefore, to assist users of Trees A, B, and C in their genealogical research, it is often advantageous to identify, group, and possibly merge together tree persons that are determined to correspond to the same real-life individual.

One method for determining whether Tree Persons A15, B13, and C5 correspond to the same real-life individual is a rule-based algorithm in which a human expert looks at different pairs of persons and creates rules. For example, consider that two persons are named "Jack Smith" but one is born in Mar. 1, 1981 and the other is born in Mar. 1, 1932. A rule-based algorithm may generate four separate scores, one for a comparison of the names (a high score in this example), one for a comparison of the month of birth (a high score in this example), one for a comparison of the day of birth (a high score in this example), and one for the year of birth (a low score in this example). The four separate scores are added together to generate a final similarity score. The higher the similarity score, the higher the probability that the two tree persons correspond to the same real-life individual.

There are several disadvantages to purely rule-based algorithms. First, they are subjective. When scores are combined into a final similarity score, they may be weighted such that the final similarity score is overly sensitive to the chosen weighting, which may be arbitrary. Second, rule-based algorithms become extremely complicated as they must account for several special cases, such as popular names. Third, rule-based algorithms are difficult to update and maintain. Over time, there may be hundreds of rules to generate a single final similarity score. If new special cases arise, a human expert has to verify whether all the previously generated rules will apply to the new case or not. If a particular rule does not apply, then a change may be needed.

Existing entity-resolution approaches are further limited by the challenge of erroneous clustering of distinct entities, which frustrates users and is difficult to correct. In an integrated genealogical research service where both genealogical and genetic services are provided, incorrect resolution of two or more distinct entities to the same tree person or cluster can problematically result in entity-resolution errors propagating through downstream processes and products, such as genetic prediction tools.

For instance, where predictions are generated for how a user may fit within an existing family tree, errors in entity resolution may lead to a prediction that a user fits into a family tree that is completely unrelated to the user, leading to reduced user engagement and trust. In genealogical research services where customer hints are generated and distributed to users, such errors can lead to a customer receiving hints to a completely unrelated person that was mistaken for the user's ancestor, further eroding user satisfaction, engagement, and trust.

Further, existing entity-resolution techniques such as machine-learned ("ML") decision tree-based compare engines are extremely difficult to debug, and a single problem can require thousands of new truth set entries to overcome. As described above, given the scale of truth sets required for supervised ML genealogy comparisons, addressing such problems can be infeasibly costly and complex. Relatedly, entirely ML-based systems are difficult if not impossible to interpret (or adjust) for determining (and modifying) factors that lead to one result over another because such models process input data to generate a predicted output using uninterpretable latent analysis. As another drawback of purely ML-based systems is the lack of training data to cover the many possible edge cases of comparing entities or tree persons. Indeed, ML training data is severely lacking or nonexistent for training models to predict relationships between tree persons based on certain data, such as living ranges, names (and their regional differences) and/or specific life events (and their timing). Even if such data existed, training a model on such enormous datasets would be prohibitively and time consuming computationally expensive.

Entity-resolution techniques that have identified that a pair or pairs of fields between a pair of entities are sufficiently matching to classify the pair of entities as the same entity should, upon encountering or receiving additional matching fields, continue to classify the pair of entities as the same entity. However, entity-resolution compare engines that are dependent upon a truth set for matching logic have been found to generate wildly wrong answers when encountering unfamiliar types of data, even when such unfamiliar types of data serve, upon human analysis, to further confirm a match between the pair of entities.

As a result, at times the entity-resolution compare engine, upon receiving additional matching fields for a pair of entities classified as the same entity, problematically changes its classification to a lower-strength match or not a match. This is a massive problem given that truth sets for genealogy comparisons must handle all possible combinations of field values for person and family-member data, which can number well into the 100 million range, far beyond the feasible range for a human labeler, such as a professional genealogist, to judge and label at the necessary scale.

A problem with existing entity-resolution engines, therefore, is a lack of internal consistency. It has been found that entity-resolution engines will sometimes change a classification in nonsensical ways when one of two entities is changed; for example, upon changing one of the two entities to be even more similar to the other, the entity-resolution engine will change its classification from SAME to PLAUSIBLE, or from PLAUSIBLE to DIFFERENT, when the classification should at least stay the same, if not become stronger, e.g. from DIFFERENT to PLAUSIBLE or from PLAUSIBLE to SAME. In view of this lack of internal consistency, there is a need for an improved method or tool to check any given entity-resolution engine for internal consistency such that changes may be made to the entity-resolution engine where needed.

Entity-Resolution for Genealogical Databases Embodiments

One or more of the above-mentioned drawbacks are addressed in certain entity-resolution embodiments of the present disclosure, which advantageously facilitate improved entity resolution with economies of computing-resource costs and complexity. The entity-resolution embodiments rely on a hybrid machine-learned, rule-based implementation for determining, e.g. classifying, whether two entities are the same "SAME," plausibly the same "PLAUSIBLE," not the same "DIFFERENT," siblings "SIBLINGS," or otherwise. The entity-resolution embodiments utilize odds/scores and weights for one or more fields to classify pairings of entities, such as tree persons from a genealogical database.

This advantageously ensures that the importance and sameness of each field is determined independently and then combined such that high accuracy is obtained for determining SAME and PLAUSIBLE, thereby ensuring good results for downstream products and processes, such as customer hints and DNA paths between relatives. It has been found that the entity-resolution embodiments address the limitations of truth-set dependent compare engines where further matching information incorrectly degrades the quality of a match; by contrast, in the disclosed entity-resolution embodiments, once the weighted field matching scores cross a threshold for being considered SAME or PLAUSIBLE, any additional matching fields strengthen, rather than degrade, the score. Indeed, experimenters have demonstrated that recall performance of the disclosed system is much better than prior systems, exhibiting a 3-4% increase in recall accuracy when tested over (billions of) digitized newspaper records (e.g., Everyday Stories). One particularly difficult case is predicting whether two entities (e.g., tree persons) are the same individual or siblings, and experimenters have demonstrated that the disclosed systems generate predictions that more accurately distinguish between same tree persons and sibling tree persons as compared to prior systems.

Computation cost economies are also realized by the disclosed embodiments, as each field on each family member is, in embodiments, only accessed once, and the individual results are rolled up into a final assessment, reducing the time and resources required for classifying a pair of entities. Revision costs are reduced as, if a single field is updated or added, only those persons with those fields present and populated will have a changed result. Additionally, the entity-resolution embodiments further facilitate easier debugging owing to the isolated-field approach, which renders individual problems easier to identify and rectify. As a result, costs of development are significantly reduced.

Table 1 shows an exemplary and non-limiting list of fields that may be used to classify a relationship between a pair of entities.

TABLE 1

| | |
|---|---|
| Gender | Given Name |
| Surname (Married) | Surname (Maiden) |
| Birthdate | Birth Place |
| Marriage Date | Marriage Place |
| Death Date | Death Place |
| Residence Date | Residence Place |
| Military Event Date | Military Event Place |
| Race | DNA Test Identification Number |
| Street Address | Occupation |
| Military Identification Number | |

The fields shown in Table 1 may be accessed, scored, and/or applied for one or more of the following relationships: father, mother, spouse, child. Thus features for both entities, e.g. tree persons, in a particular pair of entities, along with features for persons related to those tree persons, such as the tree persons' parent(s), spouse(s), child(ren), may be identified, accessed, scored, and applied as part of a classification of the pair of entities as being SAME, PLAUSIBLE, DIFFERENT, SIBLING, or any other suitable classification. The field values may be identified in and/or retrieved from tree data for a pertinent tree person within a genealogical database, such as a genealogical tree database and/or a genealogical cluster database.

Based on the classification for the pair of entities, a genealogical database, such as a tree database and/or a cluster database, may be modified to reflect the relationship, if any, between the entities. The tree database and/or cluster database may be a database such as those described in, for example, at least U.S. Patent Application Publication Nos. 2022/0253484, published Aug. 11, 2022, 2020/0394188, published Dec. 17, 2020, 2021/0319003, published Oct. 14, 2021, and U.S. Pat. No. 11,321,361, granted on May 3, 2022, each of which is hereby incorporated in its entirety by reference.

Figure 2:
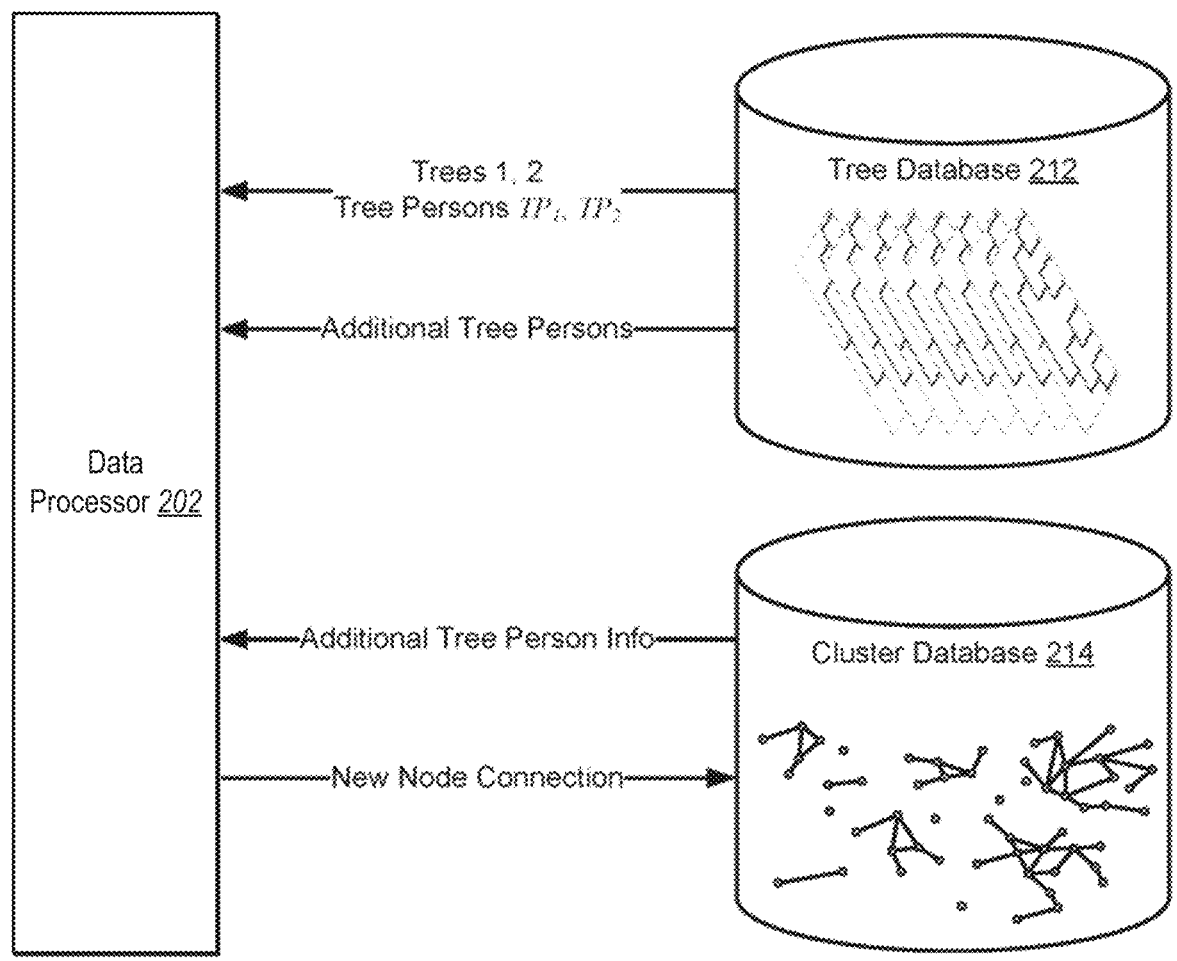
FIG. 2 illustrates an example block diagram for modifying a cluster database in accordance with one or more embodiments.
Figure 4A:
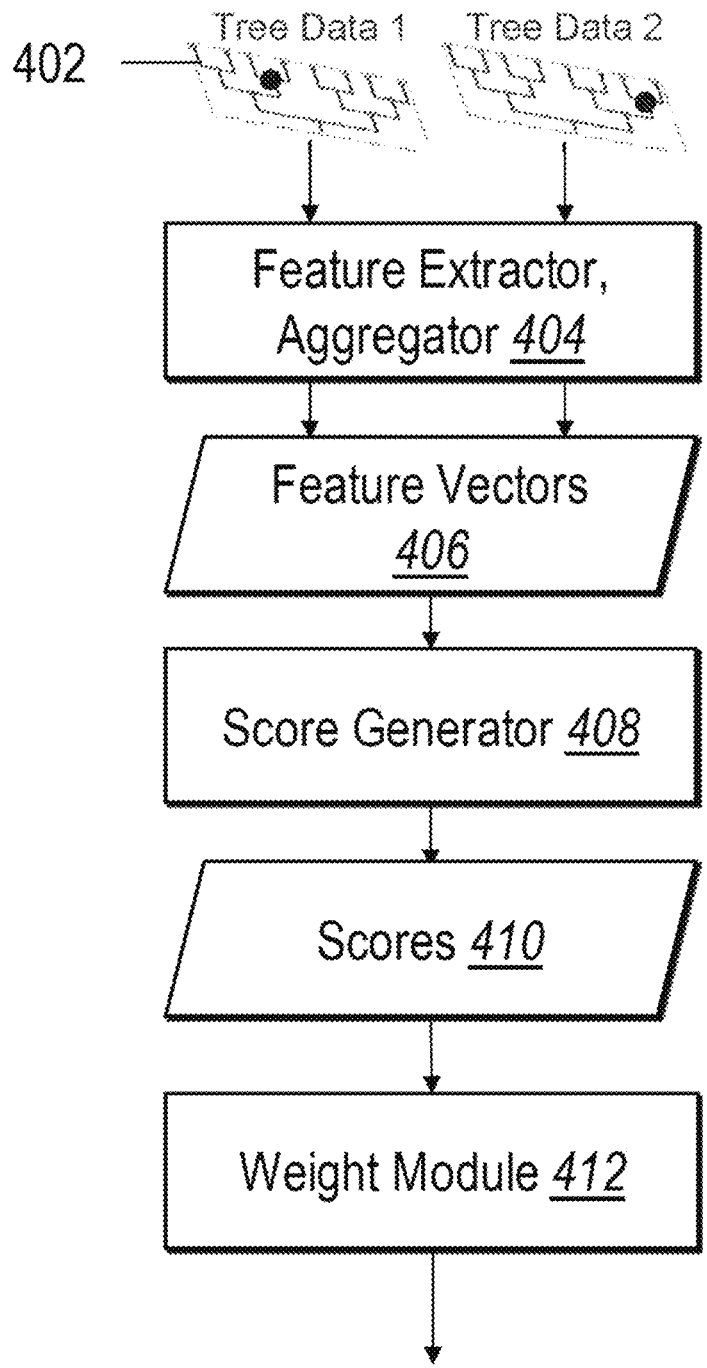
FIGS. 4A-4B illustrate an example sequence diagram for transforming tree data into classifications for entity resolution in accordance with one or more embodiments.
Figure 4B:
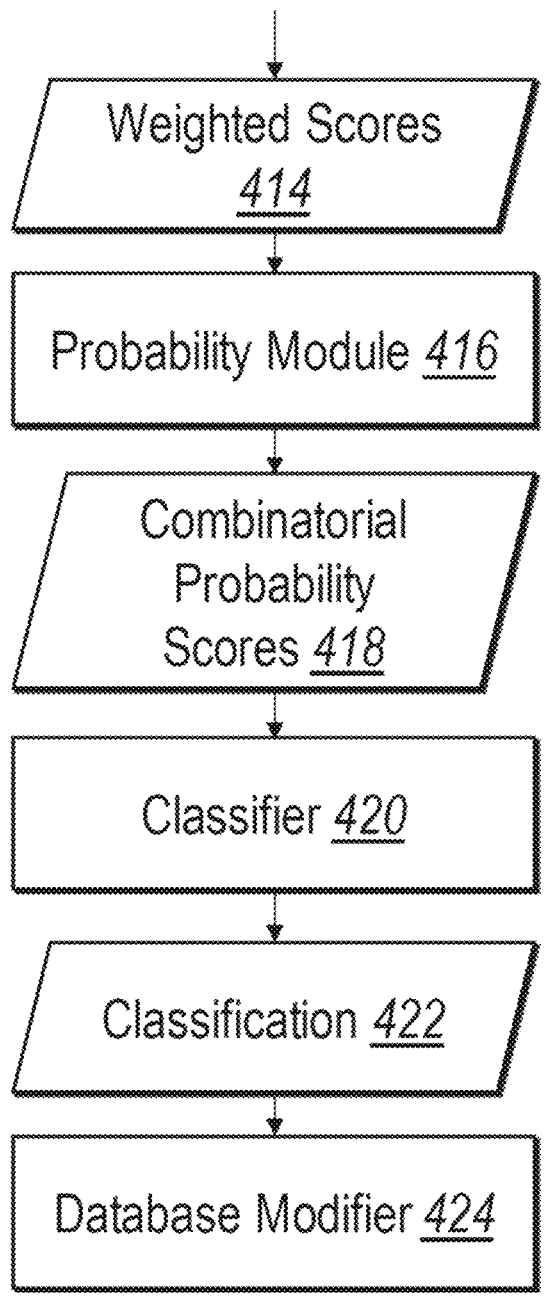

FIG. 2 illustrates a block diagram of a system 200 for modifying a cluster database 214, according to an embodiment of the present disclosure. System 200 includes a data processor 202 and two databases, a tree database 212 and a cluster database 214. In some embodiments, tree database 212 and cluster database 214 may be maintained as a single database. In some embodiments, data processor 202 includes modules, processes, and/or components as described below in relation to FIGS. 4A, 4B.

To elaborate, as shown in FIG. 2, the system 200 modifies the cluster database 214 (e.g., a genealogical database storing nodes and edges/connections for tree persons of the tree database 212) based on one or more entity resolution techniques described herein. For example, the system 200 resolves clustering errors that result from erroneous clustering of distinct entities and/or from erroneous separation of a single entity into multiple nodes. In some embodiments, the system 200 compares tree data (e.g., from the tree database 212) for two tree persons $TP_1$ and $TP_2$. Based on the comparison, the system 200 determines a combinatorial probability score that the two tree persons, $TP_1$ and $TP_2$, are the same person.

In some cases, the system 200 determines that $TP_1$ and $TP_2$ are the same tree person based on a combinatorial probability score with at least one component (e.g., M, D, and/or L) that satisfies a sameness threshold (or a similarity threshold). Accordingly, the system 200 can combine $TP_1$ and $TP_2$ into a single node within the cluster database 214. Conversely, in some cases, the system 200 determines that $TP_1$ and $TP_2$ are different tree persons based on determining a combinatorial probability score that fails to satisfy a sameness threshold. Accordingly, the system 200 can generate (or maintain) separate nodes for $TP_1$ and $TP_2$ within the cluster database 214. As mentioned, the entity resolution techniques disclosed herein facilitate improved database storage and more efficient memory usage. Indeed, by resolving entities and combining nodes within the cluster database 214, the system 200 can preserve database storage capacity (e.g., for millions of nodes or tree persons), consuming less memory that would otherwise be wasted in less efficient systems that cannot (or that less accurately) resolve entities based on a combinatorial probability score.

Figure 3:
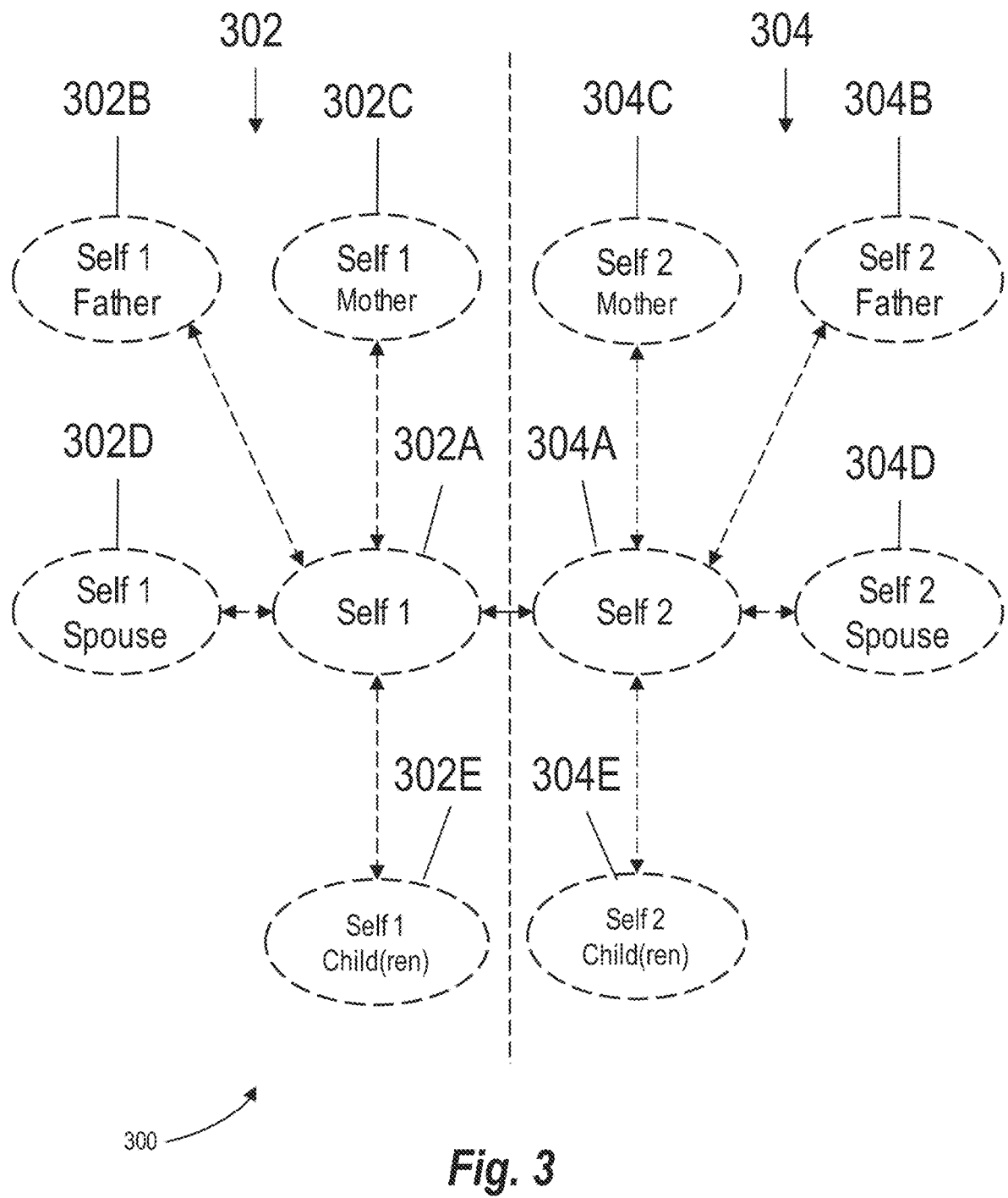
FIG. 3 illustrates an example comparison between two entities within a genealogical database (e.g., a cluster database) in accordance with one or more embodiments.

As seen in FIG. 3, a comparison 300 between two entities 302, 304 may include comparisons based on relatives of the entities 302, 304. Thus, in addition to identifying, retrieving, and utilizing data for a self 302A, entity-resolution embodiments of the disclosure may similarly identify, retrieve, and utilize data for the self's 302A father 302B, mother 302C, spouse(s) 302D, child(ren) 302E. The data retrieved for each such person may include values, where available, for one, some, or all of the features in Table 1 above. Similarly, corresponding persons may be identified, retrieved, and utilized for the entity 304, including the self 304A, the self's 304A father 304B, mother 304C, spouse(s) 304D, and child(ren) 304E. Comparisons may be made using the retrieved features for corresponding ones of the retrieved persons.

In embodiments, clustered persons may be obtained, where available, for one or more of the entities involved in the comparison 300. For example, the spouse 302D may be included in a cluster of the cluster database with another tree person in a different pedigree. The other tree person from the different pedigree may be accessed, along with pertinent data such as values for the abovementioned features, for additional comparisons with the spouse 304D. This may be performed for one, some, or all of the other persons in FIG. 3. In embodiments, this is performed only for a compared person who represents the cluster to which they belong. The person who represents a cluster may be determined automatedly based on any suitable Turning now to FIGS. 4A and 4B, a diagram 400 that shows the transformation of tree data 402 into classifications 422, which facilitate the modification 424 of a genealogical database, is described. The tree data 402 may include one, some, or all of the field values described above regarding Table 1. Such tree data 402 may be accessed by or provided to a feature extractor 404 module. This may be performed for one or more possible pairings of tree persons in a genealogical tree database. In embodiments, the diagram 400 applies or is applied to any possible combination of tree persons; in some embodiments, the diagram 400 applies or is applied to possible combinations of tree persons that fall above a predetermined preliminary similarity threshold; in some embodiments, the diagram 400 applies or is applied to combinations of newly added tree persons and existing tree persons, as suitable.

Tree data 401, 402 corresponding to entities in a pair of entities being compared may be obtained from a genealogical database, such as a tree database 212 and/or the cluster database 214. The tree data 401, 402 may include one or more of the fields described above in regards to Table 1 and may be retrieved by a feature extractor/aggregator module or component 404. The feature extractor/aggregator 404 may be configured, in embodiments, to identify pertinent data within or related to a tree person, extract the same, and generate one or more feature vectors 406 comprising the extracted features of the tree persons, with a feature vector corresponding to a single tree person. The feature extractor/aggregator 404 may likewise be configured to aggregate extracted field values and/or feature vectors 406 comprising the same into a metric function comprising a plurality of feature vectors.

One or more fields of the fields in Table 1 may correspond to or be used to generate one or more scores 410, which scores may be rolled up into an overall result. The scores 410 may be generated after generating a feature vector 406 for each of the entities being compared, with, in embodiments, a metric function representing or comprising a combined feature vector being generated and output to a score generator module.

For example, a score 410 may be computed for the field values from the entities being compared. The score may reflect how much the field values match ("M"), are different ("D"), or have one or more components that are lacking or missing ("L"). Indeed, the scores 410 may each include multiple score components, such as a matching score component ("M"), a different score component ("D"), and/or a lacking score component ("L") that combine to produce overall similarity scores. Scores 410 may be generated at or using a score generator module 408.

In embodiments, scores are generated using Jaro-Winkler distance to measure the difference between two strings, while cosine similarity is used to measure the difference between two non-strings, such as integers or vectors. Other metrics or tools may include edit distance, affine gap distance, Smith-Waterman distance, Q-gram distance, or any other suitable tool, combination of tools, and/or modification of tools. In embodiments, scores may be generated from a value of 0 (indicating zero or low similarity) to 1 (indicating perfect or high similarity), but other values or ranges are also contemplated.

For instance, for the field "Birth date," Entity A may have the following value: 2 May 1900, and Entity B may have the following value: 1900. The entity-resolution system, method, and/or computer-program product embodiments may generate a result for this particular field comparison of M=1.0, D=0.0, L=0.22, as the year component is a full or perfect match, there are no different values, and Entity B is missing a day and month value.

Contrariwise, where Entity A has the following value: 2 May 1900, and Entity B has the following value: 1901, the entity-resolution embodiments may generate a result of M=0.77, D=0.005, L=0.22, as the year component is nearly a full match but is missing day and month matching values. Different values for M, D, and L may be generated based on other scenarios, such as where year and month match but a day value is missing, where all values are present and match perfectly, where the year value is too different to have any match value and month and day values are missing, or any other suitable or conceivable differences or combinations. The entity-resolution embodiments may be configured to account for such nuances as how distant an attempted comparison is; for example, for comparing a birth date in the early $18^{th}$ century, a difference of three years between two entities is judged to be a closer match than a difference of three years in a birth date in the early $20^{th}$ century.

In addition to providing scores 410 for comparisons between field values, weights may be assigned to scores for different fields. In some embodiments, the entity-resolution embodiments are configured to generate a weight for each field and corresponding M, D, and/or L score during a comparison between two entities. The weights may be machine-learned weights in embodiments. For instance, the disclosed systems can utilize a tree data weighting machine learning model (e.g., a neural network, a logistic regression model, a decisions tree, a Bayesian network, or a support vector machine) to determine weights for the score components, M, D, and L. Exemplary weights are shown in Table 2 below.

TABLE 2

| Field | Match Weight | Different Weight | Lacking/Missing Weight |
| --- | --- | --- | --- |
| Birth Date | 0.0771 | 0.5782 | 0.0121 |
| Marriage Place | 0.0136 | 0.0025 | 0.0001 |

As seen, the "match" weight assigned by the ML model during training for birth date may be nearly an order of magnitude lower than the value assigned for a "different" weight, given the comparatively probative value of a different birth date when determining whether two tree persons are a same person. By contrast, marriage place may be assigned lower weights than birth place by the ML model during training given the comparatively lower probative value of marriage place, perhaps because people can be married multiple times. It will be appreciated that the above-described values are merely exemplary and that the entity-resolution embodiments are not limited thereto, but rather may assign any value for any weight to any field as suitable.

Weights, such as but not limited to those above, may be utilized to transform the scores 410 into weighted scores 414 by or in a weight module 412. In embodiments, the scores 410 are multiplied by corresponding, pertinent weights by the weight module 412. Other transformations are contemplated.

It has been surprisingly found that probability scores may be utilized to improve comparison quality and improve computational resource consumption. Indeed, the disclosed systems can determine (or access from a database) the probability of real-world occurrence for different data values of data fields within a set of tree data (e.g., from the tree database 212). In embodiments, the probabilities or odds of various fields are generated and combined to determine a probability of any other person or family having a particular combination of field values. For instance, the odds or probability of real-world occurrence of a person having the given name John versus Bouchier may be accounted for;

whereas John occurs as frequently as 1 out of every 21 persons, Bouchier has been found to occur in fewer than 1 out of every 200,000 persons. A given name of John, therefore, may have scores or weighted scores for given name downweighted or otherwise deprioritized when determining whether two entities with a given name of John are the same person whereas a pair of entities with the given name of Bouchier may have scores or weighted scores for given name upweighted or otherwise prioritized when determining whether two entities with a given name of Bouchier are the same person.

Additionally, or alternatively, the comparatively higher odds of a particular pair of entities being the same entity in a town named Alpine with a known population of 536 compared to in New York City, with a population of>five million, may likewise be considered. Two entities with birth places in Alpine, therefore, may have scores or weighted scores pertaining to birth place upweighted in a determination of whether the two entities represent the same person. By contrast, two entities with birth places in New York City may have scores or weighted scores pertaining to birth place downweighted in a determination of whether the two entities represent the same person. Indeed, the disclosed systems can modify or update weights (corresponding to respective score components) based on the probability of real-world occurrence for various tree-person data.

apply probabilities, such as probability scores, to one or more of the weighted scores 414 received via the weight module 412. In embodiments, probabilities may be applied directly to certain scores 410 without applying weights.

Name frequency data, population data, and suitable algorithms may be used to determine how rare a person's record attributes are, particularly where these record attributes match another person's attributes. For example, for given and surname frequencies, the top one million names within each country may be determined. This may be determined using a record collection, such as a Census record collection, for a particular timeframe, such as a particular year. A name frequency list or index may be generated.

For place population data, US Census records may be used to provide city/town, county, and state populations for particular time frames. For example, population data for cities, counties, and states may be generated for each year since, e.g., 1800. For date frequencies, birth and death per-capita data may be generated may likewise be generated from, e.g., Census documents. Other events may utilize heuristic values, such as one-half of a birth or death probability value.

An exemplary and non-limiting feature probability computation is shown in Table 3 below.

TABLE 3

| Person | Feature | Entity 1 Value | Entity 2 Value | Sub Scores |
|---|---|---|---|---|
| Self | Gender | Male | Male | M = 7 |
|  | Given Name | Steven John | Steven J | M = 57: Steven = 257, J = 26 |
|  | Surname | Viera | Viera | M = 175: Viera = 770 |
|  | Birth Date | 9 Jul. 1887 | 1960 | M = 0, D = 449, L = 3, Year 73 off |
|  | Birth Place | Springfield, MA, USA | Newington, Hartford, CT, USA | M = 0, D = 156 |
|  | Relationships | 3 | 1 |  |
| Spouse | Gender | Female | Female | M = 7 |
|  | Given Name | Julie Ann | Julie A | M = 57: Julie = 257, A = 26 |
|  | Surname | Raynock Viera | Raynock Viera | M = 227: Raynock = 1,000, Viera = 770 |
|  | Birth Date | 7 Jun. 1965 | 1965 | M = 77, D = 0, L = 3 |
|  | Birth Place | New Britain, Hartford, CT, USA | Newington, Hartford, CT, USA | M = 103, D = 78 |

Fields that may be utilized to generate a combinatorial probability score may include given name, surname, birth place, birth date, marriage place, marriage date, residence place, residence date, death place, death date, life range, or any other suitable field. Values from one or more of the abovementioned fields may be retrieved from one or more persons corresponding to an entity. In embodiments, values for each of the abovementioned fields are retrieved, where available, from all family members of an entity. "Family members" (or "relatives") as used here refers to spouse(s), parent(s), and child(ren) of the entity. However, it will be appreciated that other relatives, including siblings, avuncular relationships, grandparents, cousins, and others may be used as suitable.

Combinatorial probability scores 418 may be generated in or by a probability module 416, which may be configured to In the example shown in Table 3, given name probabilities may be as follows: 1 out of 159 persons has the name Steven or a synonym thereof; 1 out of 16 persons has a name part with a J as an initial; 1 out of 342 persons has Julie or equivalent; 1 out of 19 persons has a name part with A as an initial. Together, these odds yield a 1 out of 16.5 million probability (159*16*342*19) for a couple to have those particular names and initials.

Surname probabilities may be as follows: 1 out of 322 persons has the surname Viera; 1 out of 100,000 persons may be determined to have the surname Raynock (which may be an uppermost rareness value to make up for potentially missing lookup data). Together, these odds yield a 1 out of 32.2 million probability (322*100,000) for a couple to have those particular surnames.

Date probability may be as follows: 1965→1 out of 202 probability, as this is the rate of how many pairs of persons have the same birth year out of a general population of persons with overlapping lifelines.

Place probability may be as follows: Hartford County, Connecticut, USA→1/278,417 probability, as this is the rate of females in this county in 1965.

The probabilities for given name, surname, and date may be combined to yield: 16,530,912×32,200,000×202=107,523,664,012,800,000. The combined probability is 1 out of 107 quadrillion that another couple has that same matching information.

The combined probabilities are then modified to consider the place probability, so as to account for how many place populations can fit into the 107 quadrillion probability to see how many such places it would take to encounter another matching couple. Thus, the combined probabilities for given name, surname, and date are divided by the odds for the place, which yields: 107,523,664,012,800,000/278,417=386,196,475,117 or basically 1 out of 380 billion such places would have a couple with this matching data.

Thus, the comparison in Table 3 yields a determined combinatorial odds of 380 billion, with a combinatorial score of M=240, D=5000, L=3.

As another example, a particular pair comparison may have field values Leonard (given name; 1/359), Gerber (surname; 1/328), and 6 Aug. 1944 (date; 1/74,000), with no place information available. In lieu of available place information, the male population for the US in 1944 may be used (1/41,967,792). Taking the combined probabilities for given name, surname, and date. 359*328*74.000=1/8,713,648,000, or 1 in nearly 9 billion. Dividing by population value yields: 8,713,648,000/41,967,792=207 or basically 1 out of 207 such places would have a person and event that matched.

Another example where combinatorial odds are lower is shown in Table 4.

TABLE 4

| Person | Feature | Entity 1 Value | Entity 2 Value | Sub Scores |
|---|---|---|---|---|
| Self | Gender | Male | Male | M = 7 |
| | Given Name | Michael | Michael | M = 51: Michael = 257 |
| | Surname | Tremaine | Tremaine | M = 227: Tremaine = 1,000 |
| | Birth Date | 1930 | 1930 | M = 0, D = 0, L = 2 |
| | Birth Place | USA | USA | M = 0, D = 0, L = 8 |
| | Marriage Date | 24 Aug. 1954 | 5 Oct. 1954 | M = 22 |
| | Marriage Place | USA | USA | |
| | Relationships | 1 | 1 | M = 0, D = 0, L = 55 |
| Mother | Gender | Female | Female | M = 7 |
| | Given Name | Jane | Elizabeth | M = 0: D = 271 |
| | Surname | Tremaine | Cruz | M = 0, D-189 |
| | Birth Date | 1911 | 1906 | M = 0, D = 144, L = 2, Year~5 Off |
| | Birth Place | Fremont, California | Amarillo, Texas | M = 0, D = 156 |
| | Marriage Date | 15 Sep. 1932 | 29 Sep. 1927 | M = 0, D = 1, Year~5 Off |
| | Marriage Place | Fremont, California | Amarillo, Texas | M = 0, D = 2 |

The example in Table 4 may yield combinatorial odds of 2.90, which may classified as LIKELY.

In embodiments, the probability module 416 is configured to account for probabilities of names that pair together at a high rate than random, e.g. Mary Ann, Billy Joe, etc., family names that run together, e.g. Tom Graham and a similar aged cousin also named Tom Graham, inaccurate lookup data, and/or synchronized events like group marriages where a plurality of couples get married in the same place at the same time. In embodiments, the probability module 416 takes into account normalized name frequencies, age or gender demographics, and/or other factors.

Each field and the subsequent parts or scores for matching M, different D, and missing L may all have different weights in a final assessment of overall same, plausible, or different, which may be determined by or in a classification module. The weights may be generated using a machine learning model, in embodiments using a supervised learning process.

A supervised learning process may entail generating ground truth labels, which may be provided by, in family-history contexts, a professional genealogist. The ground truth labels may be provided for any suitable number of comparisons between a plurality of pairs of entities. A model may be provided with randomly determined weights between 0 and 1 for each of the fields to be weighted. The model may be run using a training portion of the plurality of pairs of entities provided to the professional genealogist. A binary search method may be used to change one or more of the weights and repeat the comparisons until there is no further improvement in agreement between the model outputs and the ground truth labels. While a binary search method is described, it will be appreciated that any other suitable modality may be utilized. The finalized weights may be used to run the model against a test set portion of the plurality of pairs of entities.

The combinatorial probability scores 418 may be provided to a classifier module 420, whereupon a classification 422 is generated for the pair of entities. The classification 422 may, in embodiments, be selected from the group consisting of SAME, PLAUSIBLE, and DIFFERENT. It will be appreciated that the disclosure is not limited thereto, but rather may include any suitable number and type of classifications, including SIBLING, VERY DIFFERENT, etc. The classification may be performed on the basis of a predetermined threshold for the classification categories or in any other suitable manner.

The classification 422 may be used to modify a database, such as a cluster database. For instance, upon receiving a classification of SAME for two entities, the database modifier 424 may be configured to assign the two entities to a same cluster, to generate a new cluster that encompasses the two entities, or otherwise.

Figure 5:
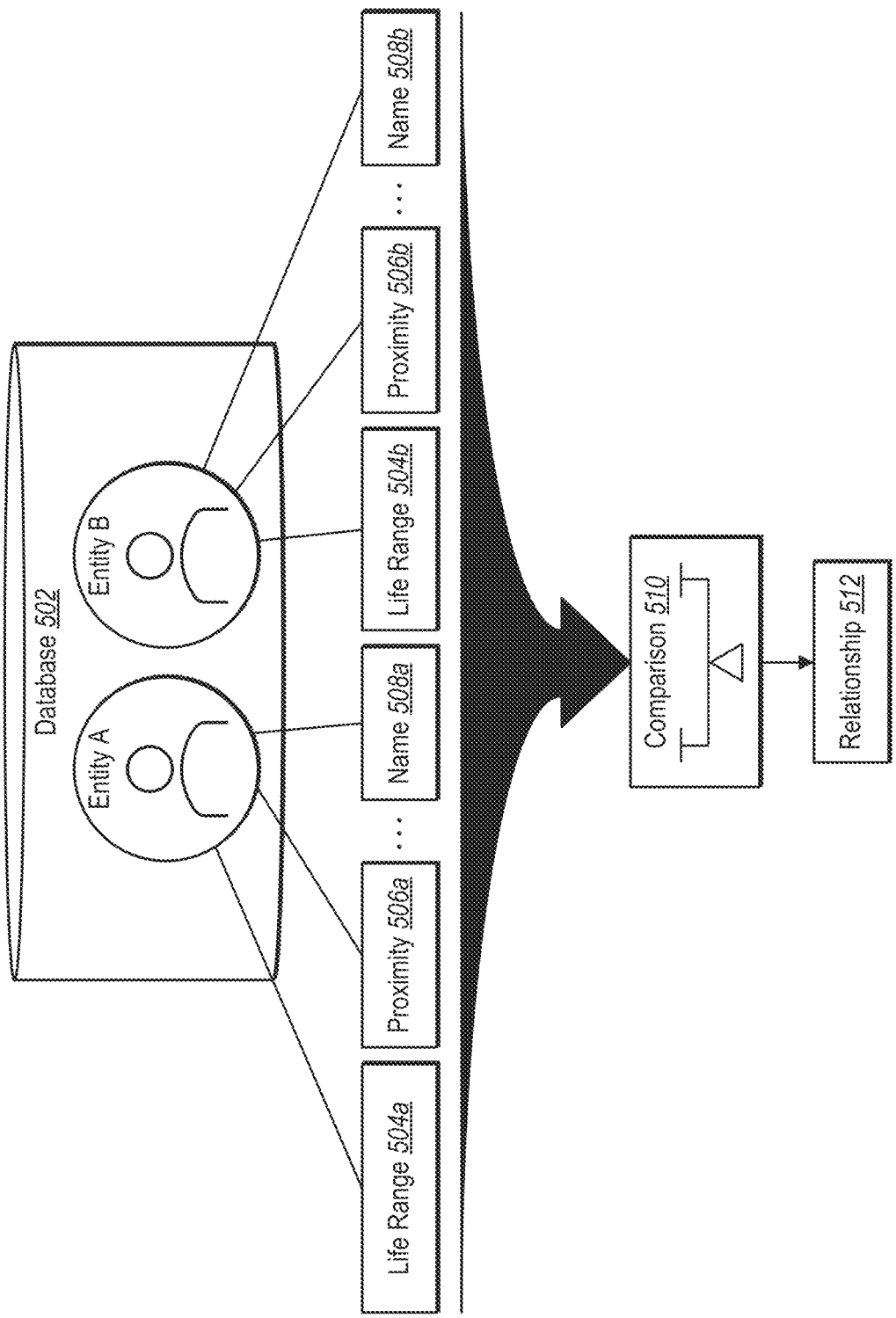
FIG. 5 illustrates an example diagram for predicting a relationship between two entities in accordance with one or more embodiments.

As noted above, in some embodiments, the entity-resolution system described herein performs entity resolution by determining or predicting a relationship between two entities or tree persons. In particular, the entity-resolution system determines or predicts the relationship using a machine-learning model, such as a decision tree (or an ensemble of decision trees), to generate a combinatorial probability score indicating a relationship of SAME, PLAUSIBLE, or DIFFERENT. FIG. 5 illustrates an example diagram for predicting a relationship between two entities (or tree persons) by performing a comparison of various data fields that contribute to a combinatorial probability score in accordance with one or more embodiments.

As illustrated in FIG. 5, the entity-resolution system accesses a database 502 (e.g., a genealogical record database or a cluster database) storing genealogical records or clusters for multiple entities or tree persons. For instance, the entity-resolution system identifies a first entity (Entity A) and a second entity (Entity B) within the database 502. In addition, the entity-resolution system determines stored data for Entity A and Entity B, including data corresponding to various data fields for comparing and/or resolving Entity A and Entity B within the database 502. As shown, the entity-resolution system determines a life range, one or more proximity values corresponding to various life events, and/or name data corresponding to the respective entities (in addition to other field values described above).

To elaborate, the entity-resolution system determines and compares a life range 504a for Entity A with a life range 504b for Entity B. Indeed, the entity-resolution system determines the life range 504a as a possibly living range for Entity A. For instance, the entity-resolution system determines a life range based on known dates for one or more life events of Entity A. In some cases, the entity-resolution system determines a life range as a time period starting at an earliest possible birth date and ending at a latest possible death date. For example, the entity-resolution system determines an earliest possible birth date and/or a latest possible death date from dates of life events. To determine the life range 504a, the entity-resolution system accesses known data for Entity A, including dates for available life events, which may include a birth date, a death date, a date of having a child, and/or a marriage date. The entity-resolution system can also determine the life range 504a based on life events of relatives (e.g., children and/or parents) of Entity A. The entity-resolution system likewise determines the life range 504b for Entity B. Additional detail regarding determining and comparing life ranges is provided below with reference to FIG. 6.

As also shown in FIG. 5, the entity-resolution system determines and compares proximity data 506a for Entity A with proximity data 506b for Entity B. More particularly, the entity-resolution system determines proximity data 506a by determining known locations of life events for Entity A and by applying a proximity threshold to the known locations. For instance, the entity-resolution system determines a location where Entity A lived at a particular date, and the entity-resolution system applies a proximity threshold (or radius) to the location such that life event locations that occur within the proximity threshold can be treated as possibly belonging to Entity A. For example, if the entity-resolution system determines that Entity B gave birth to a child at a hospital located within the proximity threshold of the living location for Entity A, then the entity-resolution system may modify a combinatorial probability score between Entity A and Entity B to indicate SAME or PLAUSIBLE. Conversely, the entity-resolution system reduces a combinatorial probability score between Entity A and Entity B based on determining life events that occur outside of a proximity threshold. The entity-resolution system likewise determines the proximity data 506b based on locations of life events for Entity B.

In some embodiments, the entity-resolution system adjusts proximity thresholds for different geographic regions and/or for different time periods or eras. For example, the entity-resolution system customizes the size or radius of a proximity threshold based on the time period of a life event and/or a geographic region of a life event. In some cases, proximity thresholds are smaller in earlier eras (e.g., 1500s) and larger in later eras (e.g., 2000s) as travel is easier and people travel farther in modern times than in times past. Similarly, proximity thresholds are smaller in countries or geographic regions with available data indicating smaller travel patterns among people who live there. In some cases, the entity-resolution system can apply larger weights when life events occur within smaller proximity thresholds, thus indicating a higher combinatorial probability score (e.g., a higher SAME likelihood).

As further illustrated in FIG. 5, the entity-resolution system determines name data 508a for Entity A. More specifically, the entity-resolution system determines the name data 508a by determining impacts of geographic region and/or time period on a name (e.g., a given name and/or a surname) of Entity A. For example, the entity-resolution system determines region data that indicates that Entity A may have multiple surnames and/or may have a surname that only follows one generation (without passing to further generations). As another example, the entity-resolution system determines a region data indicating that the name of Entity A may indicate a relationship to one or more other entities in the database 502. As yet another example, the entity-resolution system determines time period data indicating that Entity A may have a common given name for the time period (e.g., as name frequency/popularity changes over time and/or for different regions). Indeed, the entity-resolution system can determine name frequencies based on available data for various time periods and/or geographic regions. The entity-resolution system can thus modify weights (and/or combinatorial probability scores) based on name frequency data, time period data, and/or region data associated with the name data 508a. The entity-resolution system likewise determines name data 508b for Entity B.

As also illustrated in FIG. 5, the entity-resolution system performs a comparison 510. To elaborate, the entity-resolution system performs the comparison 510 by comparing the life range 504a with the life range 504b, comparing the proximity data 506a with the proximity data 506b, and/or comparing the name data 508a with the name data 508b. For instance, the entity-resolution system compares life ranges to determine amount of overlap between the life ranges. The entity-resolution system further compares proximity data to determine whether life events of the two entities occur within proximity thresholds of one another. Additionally, the entity-resolution system compares name data to determine similarities between entity names, weighted according to name frequency, time period, and/or region.

In some cases, the entity-resolution system generates a combinatorial probability score through the comparison 510. Indeed, the entity-resolution system can generate a weighted score for each data field (e.g., life range, proximity data, name data, and/or other data fields described above), where the weighted score includes a matching score component, a different score component, and a lacking score component, each with its own respective weight. From the data field scores, the entity-resolution system further determines a combinatorial probability score to use as the basis for classifying a relationship 512.

Indeed, based on the comparison 510, the entity-resolution system determines the relationship 512 between Entity A and Entity B. For instance, he entity-resolution system provides a combinatorial probability score to a classifier, whereupon the classifier classifies the relationship 512. In some cases, possible classes include SAME, DIFFERENT, or PLAUSIBLE. In these or other cases, possible cases can also include SIBLING or VERY DIFFERENT (or others described herein), depending on the combinatorial probability score.

Figure 6:
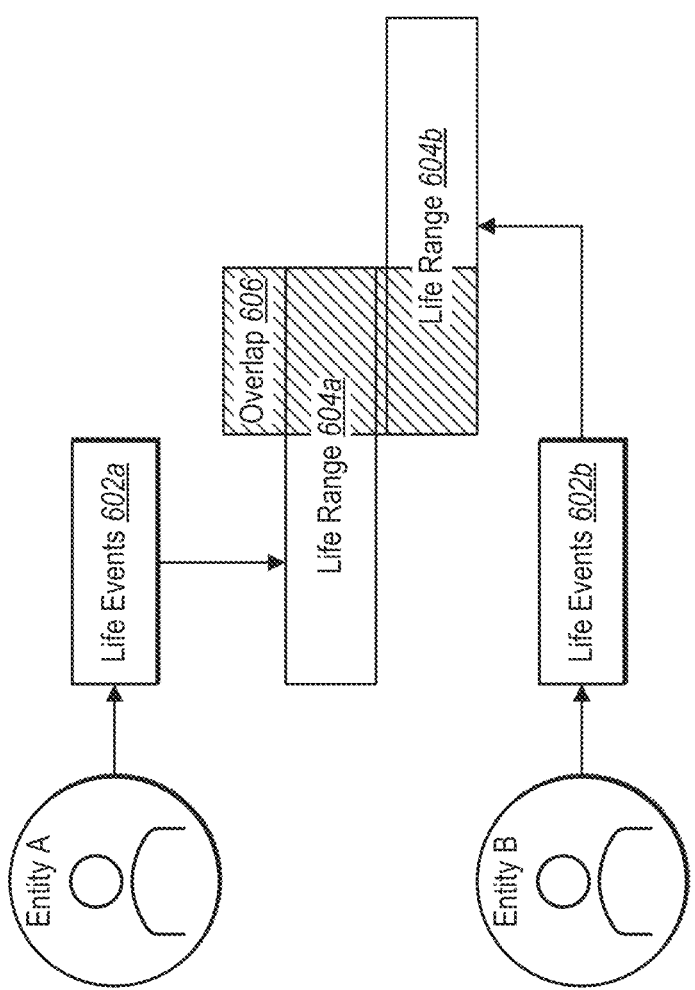
FIG. 6 illustrates an example diagram for determining and comparing life ranges in accordance with one or more embodiments.

As noted above, in certain embodiments, the entity-resolution system determines and compares life ranges for entities (e.g., tree persons) in a database. In particular, the entity-resolution system determines a life range based on timing associated with particular life events for the entity and/or timing associated with life events of relatives of the entity. FIG. 6 illustrates an example diagram for determining and comparing life ranges in accordance with one or more embodiments.

As illustrated in FIG. 6, the entity-resolution system determines life ranges for two entities, Entity A and Entity B. To determine the life range 604a of Entity A, the entity-resolution system determines life events 602a. More specifically, the entity-resolution system determines the life events 602a for Entity A and/or for relatives of Entity A. For example, the entity-resolution system determines known dates for any life events (e.g., birth, death, birth of a child, and/or marriage) available in stored data. From the life events 602, the entity-resolution system determines the life range 604a as a time from an earliest possible birth date to a latest possible death date of Entity A. The entity-resolution system likewise determines life events 602b for Entity B and/or for relatives of Entity B.

In some cases, the entity-resolution system determines a birth event for Entity A and/or Entity B (e.g., from stored records indicating a known birth date). From the birth event, the entity-resolution system determines a life range for Entity A and/or for Entity B. For instance, the entity-resolution system determines a maximum age for an individual (based data available from a time period and/or geographic region of the individual) and thus generates the life range 604a (or the life range 604b) as a duration from the known birth date to the maximum age. Similarly, if the entity-resolution system determines a known death date for Entity A (or Entity B), the entity-resolution system can subtract the maximum age from the known death date to determine the life range 604a (or the life range 604b).

In one or more embodiments, the entity-resolution system determines the life range 604a and/or the life range 604b based on other life events, such as child birth or marriage. Based on determining a known birth of a child of Entity A, the entity-resolution system can further determine an approximate birth date of Entity A. Indeed, the entity-resolution system can assume that an individual must be at least a minimum parent age (e.g., 14 years) to have a child. The entity-resolution system can thus subtract the minimum parent age from the date of the child's birth to determine an approximate birth date of Entity A. In addition, the entity-resolution system can determine a maximum parent age for Entity A based on a sex of Entity A (e.g., 75 for female, maximum age for male). Accordingly, if Entity A is female, the entity-resolution system determines that Entity A had to be anywhere from 14 to 75 years old (e.g., from the minimum to maximum parent ages) at the time of the child's birth. The entity-resolution system can thus determine the life range 604a of Entity A.

In some embodiments, the entity-resolution system determines the life range 604a (and/or the life range 604b) based on life events of relatives. For example, the entity-resolution system determines a birth date of a mother of Entity A. Based on the mother's birth date, the entity-resolution system can determine that Entity A could not have been born after a maximum parent age for females (e.g., 75 years) or before a minimum parent age (e.g., 14 years). The entity-resolution system can thus determine the life range 604a from the mother's birth date, where the life range 604a begins at the minimum birth age (14 years) after the mother's birth date and ends at a maximum age (e.g., 100 years) after the maximum parent age (e.g., 75 years).

As further illustrated in FIG. 6, the entity-resolution system compares the life range 604a and the life range 604b to determine an overlap 606. Indeed, the entity-resolution system compares life ranges to determine a relationship between Entity A and Entity B—e.g., whether (or with what probability) Entity A and Entity B are the same individual. In some embodiments, the entity-resolution system can determine scores based on amount or size of overlap, where entities with more overlap have higher matching weights and entities with less overlap have higher different weights. As shown, the entity-resolution system determines an overlap 606 of a particular time period between life range 604a and life range 604b. In some cases, the entity-resolution system can thus weight the life range data field (as part of determining a life range score and/or a combinatorial probability score) based on the amount, size, or duration of the overlap 606 (e.g., where more overlap corresponds to a higher weight to indicate a higher likelihood of being the same individual).

Figure 7:
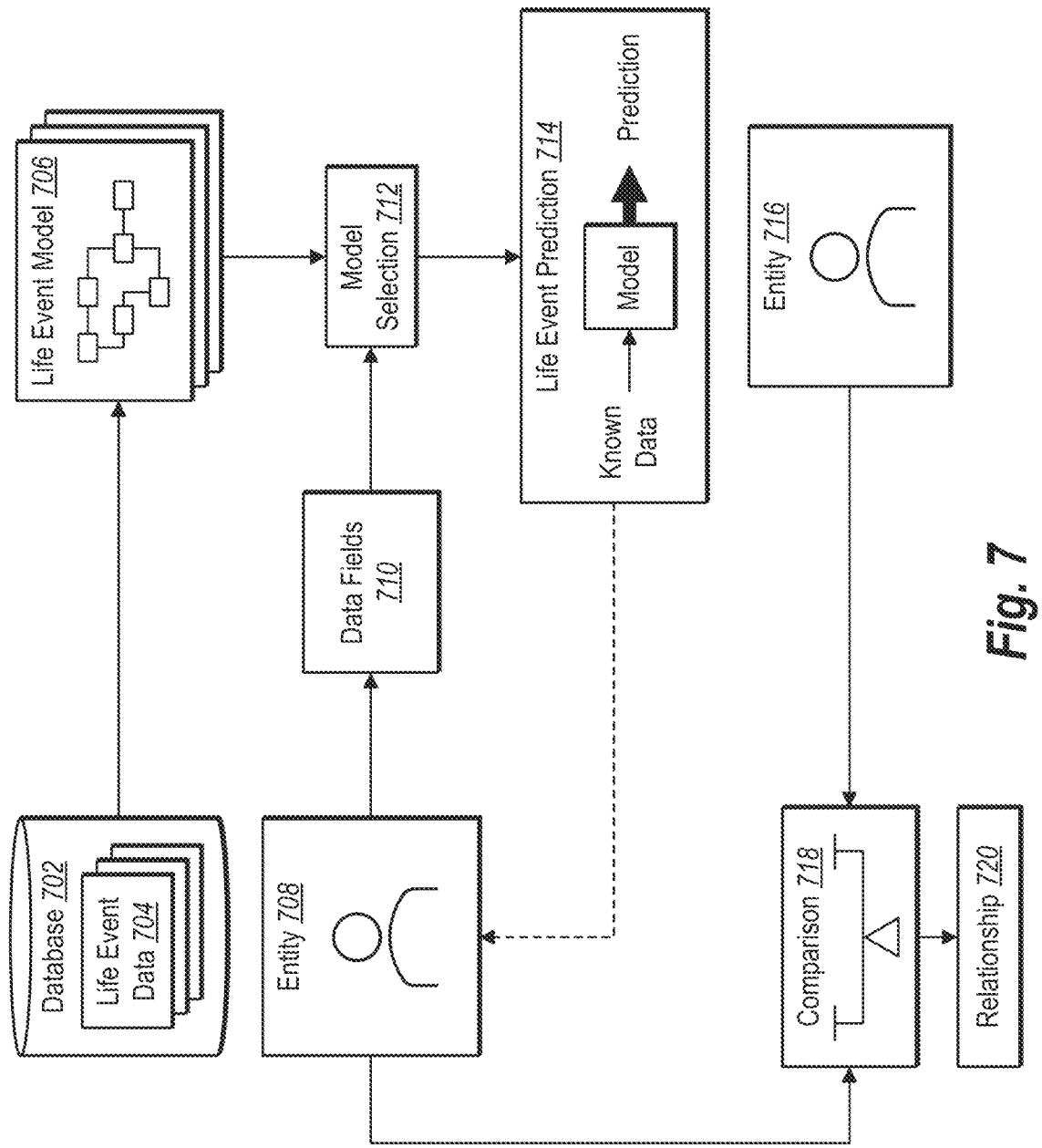
FIG. 7 illustrates an example diagram for determining a relationship based on predicting life events in accordance with one or more embodiments.

As mentioned, in certain embodiments, the entity-resolution system predicts life events for entities. In particular, the entity-resolution system determines known and unknown data fields for an entity and utilizes life event models to predict timing for unknown life events (e.g., corresponding to unknown data fields) based on probabilities of real-world occurrence. FIG. 7 illustrates an example diagram for predicting life events using a life event model in accordance with one or more embodiments.

As illustrated in FIG. 7, the entity-resolution system accesses a database 702 storing life event data 704. More specifically, the database 702 is a repository of stored life event data 704 from millions or billions of available genealogical records. From the life event data 704, the entity-resolution system generates or constructs a number of life event models, including the life event model 706. To elaborate, the entity-resolution system generates a life event model for each type of life event (e.g., birth, death, marriage, child birth, etc.). In some cases, the life event models (including the life event model 706) are probability curves indicating distributions of timing for life events, as indicated by the life event data 704 stored for records in the database 702. Indeed, the life event models can each represent a probability curve of distributions for when a respective life event could occur, as determined from stored data. In other cases, the life event models are machine learning models (e.g., neural networks) trained on the life event data 704 to predict life events.

As further illustrated in FIG. 7, the entity-resolution system identifies an entity 708 to compare with an entity 716. To elaborate, the entity-resolution system identifies entity records stored for the entity 708. From the entity records, the entity-resolution system determines data fields 710 and/or values for the data fields 710, including life range, name data, proximity data, and/or other data fields described above. In some embodiments, the entity-resolution system determines unknown or missing data fields for the entity 708.

Based on the (known and/or unknown) data fields 710, the entity-resolution system further performs a model selection 712. More specifically, the entity-resolution system selects a life event model (e.g., the life event model 706) from among available life event models. For example, the entity-resolution system selects the life event model 706 as a model for predicting life events for missing or unknown data fields associated with the entity 708. The entity-resolution system further utilizes the life event model 706 to generate a life event prediction 714 (e.g., a prediction of a life event for populating one or more data fields).

In some embodiments, the entity-resolution system determines the life event prediction 714 by analyzing one or more probability curves (defining the life event model 706) indicating distributions of when a particular life event would likely occur for the entity 708. Indeed, based on available data (e.g., the data fields 710), such as locations and/or times for one or more life events of the entity 708, the entity-resolution system can identify (as part of the model selection 712) probability curves from stored data (in the database 702) most closely corresponding to the entity 708. The entity-resolution system can further utilize the probability curves to determine a timing for an unknown life event of the entity 708 (e.g., a marriage date based on probability curves indicating when other stored entities were married based on factors such as: a common region, a common timeframe, and children of similar ages).

In one or more embodiments, the entity-resolution system determines predicted life events to determine or inform (or modify weights for) various data fields, such as life range, proximity data, name data, and/or other data fields described herein. For example, the entity-resolution system can predict a birth date for an entity and can further determine a life range for the entity based on the predicted birth date. In addition, the entity-resolution system can modify a weight for a weighted similarity score based on a probability of real-world occurrence for one or more life events (and/or corresponding data fields), as predicted via the life event model 706.

In some cases, the entity-resolution system can apply a data field weight to the field corresponding to the predicted life event based on (e.g., proportionally to) a probability indicated by a probability curve of the life event model 706 (e.g., where a 20% likelihood of having a child on a predicted date yields a corresponding weight increase, as compared to previous models which do not predict life events and therefore have no data for the missing fields). In addition, the entity-resolution system can apply or attribute the predicted life event to the entity 708. Indeed, even if a life event is unknown, the entity-resolution system can perform the life event prediction 714 to predict the unknown life event and can apply the prediction to the entity 708 to use in comparing with the entity 716.

Along these lines, and as shown in FIG. 7, the entity-resolution system performs a comparison 718 to compare the entity 708 with the entity 716. For example, the entity-resolution system performs the comparison 718 by determining a combinatorial probability score, including weighted scores for various predicted and known data fields (e.g., each with a weighted matching, different, and lacking component). As further illustrated in FIG. 7, the entity-resolution system determines a relationship 720 between the entity 708 and the entity 716 based on the comparison 718. To elaborate, the entity-resolution system provides a combinatorial probability score to a classifier model to classify the relationship as SAME, PLAUSIBLE, or DIFFERENT (and/or SIBLING or VERY DIFFERENT or others described herein).

Figure 8:
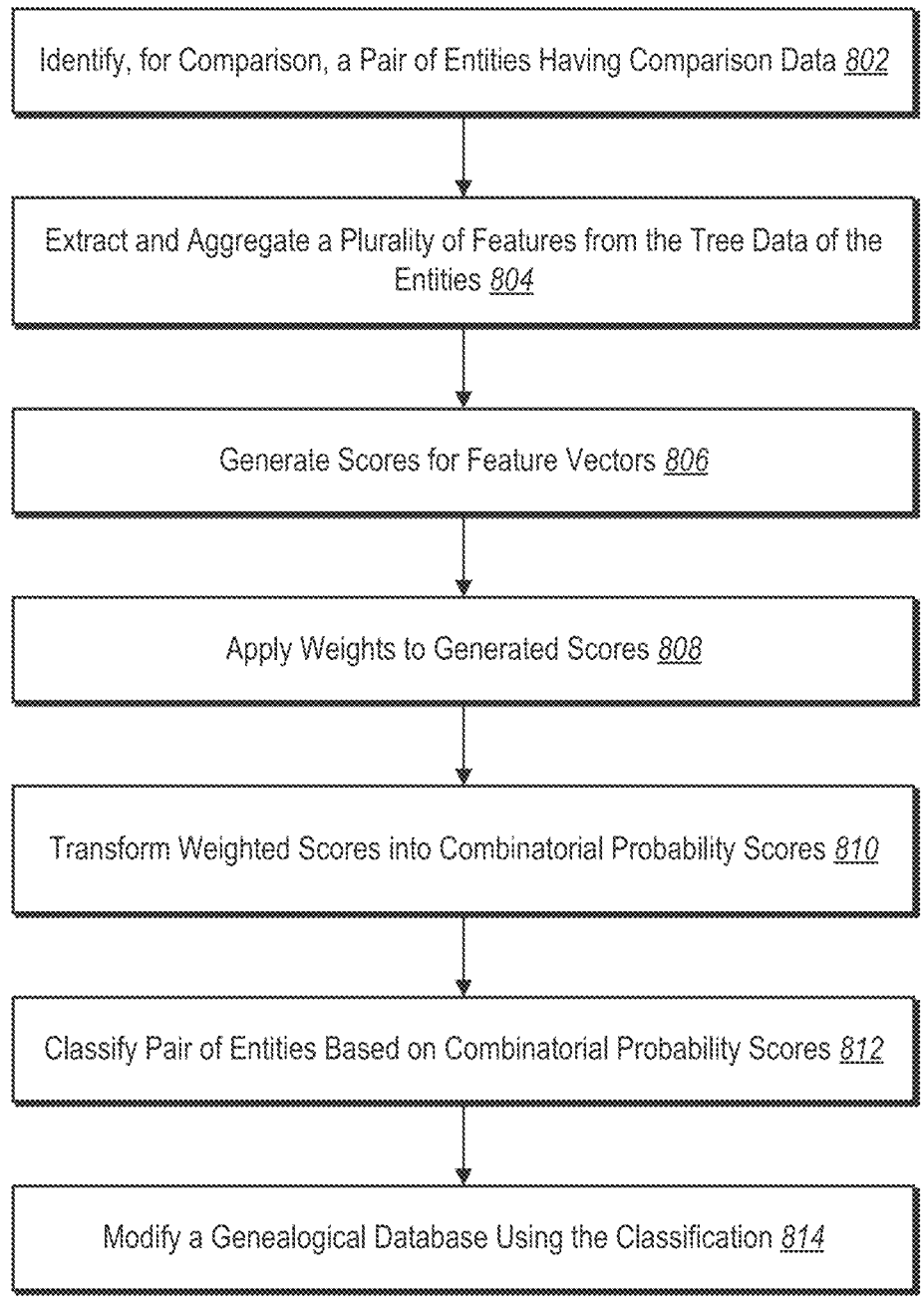
FIG. 8 illustrates an example method flow for performing entity resolution in accordance with one or more embodiments.

FIG. 8 illustrates an exemplary method 800 for performing entity resolution according to embodiments of the present disclosure. The method 800 may be performed by computing devices such as a computing server system as described below. The method 800 may be embodied as a software algorithm that may be stored as computer instructions that are executable by one or more processors. The instructions, when executed by the processors, cause the processors to perform various steps in the method 800. In various embodiments, the method 800 may include additional, fewer, or different steps in any suitable orders. While various steps in method 800 may be discussed with the use of a computing system, each step may be performed by a different computing device.

The method 800 includes a step 802 of identifying, for comparison, a pair of entities having associated comparison data. This may include tree persons identified in or from a genealogical tree database, and the associated comparison data is family trees and tree persons, with associated data, associated therewith. For example, the pair of entities may be two tree persons who are plausibly related; the method 800 may include retrieving the pedigrees and tree-person data, such as biographical data such as given name, surname, birth date, birth place, death date, death place, marriage date, marriage place, residence place, residence date, etc., for the tree persons and certain family members thereof, such as spouse(s), parent(s), and child(ren).

A step 804 includes extracting and/or aggregating a plurality of features from the associated data of the pair of entities. This may be performed by a module or component for feature extraction and aggregation, and may yield feature vectors and/or a metric function comprising the aggregated features extracted from the tree data of the pair of entities.

A step 806 includes generating scores for the extracted and aggregated features. The score may be generated using a module or component of a computing system, such as a system for entity resolution, as described herein. The score may be determined by comparing the field values for the features of each tree person against each other using techniques such as Jaro-Winkler distance for strings and/or cosine similarity for non-string field values. In some cases, the step 406 involves determining a similarity score between a first tree person and a second tree person based on comparing a first set of tree data for the first tree person and a second set of tree data for a second tree person.

A step 808 includes applying weights to the generated scores. The weights may be predetermined weights generated using a supervised machine learning approach. For example, the weights may be specific to features (such as given name) and the values for a M, D, or L value thereon. The supervised machine-learning approach may include providing and utilizing genealogist-provided labels to learn weights or values for particular features and their probative value in comparisons. In embodiments, a weight is applied to each score. In other embodiments, weights are only applied to one or more scores but not to others. In some cases, the step 808 involves generating a weighted similarity score from the similarity score by applying weights to one or more score components that make up the similarity score.

A step 810 includes transforming the weighted scores into a combinatorial probability score. The combinatorial probability score may be generated using the detected probabilities of particular field values, which may be machine-learned using, e.g., supervised machine learning methods such as genealogist-provided manual labels, unsupervised learning approaches, combinations thereof, or otherwise. The combinatorial probability score may be generated based on probabilities for a plurality of field values and the likelihood of observing a particular combination of different field values. While combinatorial probability scores have been described, it will be appreciated that probability scores may be used on individual weighted scores in embodiments. In some cases, the step 810 involves generating a combinatorial probability score from the weighted similarity score based on probabilities associated with the first set of tree data and the second set of tree data.

A step 812 includes classifying a particular pair of entities as being SAME, PLAUSIBLE, DIFFERENT, or other possible labels based on the combinatorial probability scores. The classification may be performed by a classification module, and may include the use of predetermined score thresholds, machine learning approaches, or otherwise. In some cases, the step 812 involves classifying a relationship between the first tree person and the second tree person based on the combinatorial probability score.

A step 814 includes modifying a genealogical database using the classification. For instance, where two entities are classified as SAME at step 812, a cluster database component of a genealogical database may be modified to reflect that the two entities belong to a same cluster. This advantageously allows for users with one or the other of the two entities in their pedigrees to access data, family trees, and records pertaining to the clustered entity, which data would have been otherwise unavailable to the users. Users' experiences and access to vital data is thereby enhanced. For example, hints may be generated for a user based on data accessed via or related to a clustered entity rather than the entity actually in the user's pedigree. In some cases, the step 814 involves modifying a genealogical database storing the first set of tree data and the second set of tree data based on classifying the relationship between the first tree person and the second tree person.

In some embodiments, the method 800 includes determining the similarity score by comparing a first data field of the first set of tree data and a second data field of the second set of tree data to determine the one or more score components including: a matching score component indicating a degree to which the first data field and the second data field reflect matching data, a different score component indicating a degree to which the first data field and the second data field reflect different data, and a lacking score component indicating a degree to which one or more of the first data field or the second data field reflect lacking data. In these or other embodiments, the method 800 includes generating the weighted similarity score by utilizing a tree data weighting machine learning model to determine, for a plurality of data fields, weights for the one or more score components that make up the similarity score.

In certain embodiments, the method 800 includes generating the combinatorial probability score by: determining a probability of real-world occurrence for data within one or more of the first set of tree data or the second set of tree data and modifying a weight within the weighted similarity score based on the probability of real-world occurrence for the data. The method 800 can also include classifying the relationship between the first tree person and the second tree person by selecting a classification from among a set of classifications comprising a same classification, a different classification, and a plausible classification. Further, the method 800 can include selecting the classification by comparing the combinatorial probability score with at least one sameness threshold corresponding to the set of classifications to determine which of the set of classifications corresponds to the combinatorial probability score.

In one or more embodiments, the method 800 includes, based on classifying the relationship between the first tree person and the second tree person, modifying a genealogical database storing the first set of tree data and the second set of tree data by combining the first tree person and the second tree person into a single entity. The method 800 can also include determining the similarity score by: determining data fields associated with the first tree person and the second tree person from the second set of tree data from the first set of tree data and the second set of tree data, determining additional data fields associated with relatives of the first tree person and relatives of the second tree person from the first set of tree data and the second set of tree data, and comparing the data fields and the additional data fields for the first tree person and the second tree person.

In some embodiments, the method 800 includes determining the similarity score by combining the matching score component, the different score component, and the lacking score component. In the same or other embodiments, the method 800 includes generating the weighted similarity score by weighting the one or more score components to reflect respective probative values of the one or more score components. The method 800 can also include generating the weighted similarity score by weighting data fields to reflect respective probative values of the data fields.

Internal Compare-Consistency Check Embodiments

In embodiments, an internal compare-consistency check system, method, or computer-program product may include generating and utilizing a set of test cases to assess the internal compare consistency of an entity-resolution engine. Variables and associated test identifiers may be as shown in Table 4 below.

TABLE 4

| | |
|---|---|
| Gender | 0 - Male |
| | 1 - Female |
| Given Name | 0 - Different Name |
| | 1 - Empty |
| | 2 - Same Common Name |
| | 3 - Same Rare Name |
| Surname | 0 - Different Name |
| | 1 - Empty |
| | 2 - Same Common Name |
| | 3 - Same Rare Name |
| Birth Date | 0 - Different Year |
| | 1 - Empty Year |
| | 2 - Same Year, Different Month/Day |
| | 3 - Same Year, Empty Month/Day |
| | 4 - Same State, Same Month/Day |
| Birth Place | 0 - Different State |
| | 1 - Empty State |
| | 2 - Same State, Different City |
| | 3 - Same State, Empty City |
| | 4 - Same State, Same Large City |
| | 5 - Same State, Same Small City |
| Relative | 0 - Different |

TABLE 4-continued

1 - Empty
2 - Same

As used in the above example, "Different" means that both persons have a value for that field, and the value is different, and "Empty" means that one or both persons do not have a value for that field. Combining all possible values of these six variables, there are a total of 2,880 tests (2*4*4*5*6*3), which 2,880 test sets may be passed through an entity-resolution engine to probe the entity-resolution engine for internal inconsistencies. That is, where the entity-resolution engine judges a set as DIFFERENT, it should judge a less-probable set (all test identifiers of second set<=test identifiers of first set) as DIFFERENT. Where the entity-resolution engine judges a set as SAME, it should judge a more-probable set (all test identifiers of second set>=test identifiers of first set) as SAME.

It will be appreciated that the above-described test set is not exhaustive, and that the disclosure is not limited thereto. Rather, any number of suitable variables and associated identifiers may be included. For instance, any of the variables may be expanded to include a PLAUSIBLE test identifier; other variables such as marriage date, marriage place, residence date, residence place, death date, death place, gender, and any suitable number or type of test identifiers therefor may be used. A plurality of different test sets, having different variables and different test identifiers, may be generated and run through a given entity-resolution engine as suitable.

As used herein, a label or test identifier "UNKNOWN" may correspond to an as-yet unknown compare result, but which compare result may be performed in the future. A label or test identifier "CERTAIN" may correspond to a compare result that has 99%+ certainty or confidence, such as situations where both records are full (e.g. none of the fields are missing values) and/or match each other with no significant difference. A label or test identifier "CONFIDENT" may correspond to a compare result that has 90%+ confidence, such as situations where the quantity of matching information between two entities is sufficient to know that the records refer to a same person. A label or test identifier "VERYLIKELY" may correspond to a compare result that has 75%+ confidence, such as situations where there are numerous matches (e.g. matching field values) between two entities but may still be referring to two persons who coincidentally have similar fields owing to the presence of minor or few conflicting fields, or the absence of information that would render the comparison more confident.

A label or test identifier "LIKELY" may correspond to a compare result that has 50%+ confidence, such as situations where the two entities could be referring to a same person with no "red flags," so the entities are worth associating with each other. A label or test identifier "INDETERMINATE" may correspond to a compare result that cannot be classified with confidence, e.g. >0% confidence but <50% confidence, due to key fields being conflicting such that the two entities may or may not actually be the same person and a confidence classification cannot be made either way. A label or test identifier "TOOSPARSE" may correspond to a compare result that cannot be made between two entities because there are not enough fields with available values to make a reliable comparison, and there are no conflicting field values. A label or test identifier "UNLIKELY" may correspond to a compare result that confidently (e.g. >50%) indicates that the two entities refer to two different entities or persons.

A label or test identifier "SIBLINGS" may correspond to a compare result indicating a familial relationship, such as a situation where one or more family members match strongly but the focus persons may be referring to siblings rather than the same person.

Sibling comparisons may be determined using a hybrid machine-learned and rule-based approach, in embodiments, as shown below:

1. If given names are present and do not match: Label=DIFFERENT
2. If given names are empty
   a. If birth year empty, inferred, or too far apart: Label=DIFFERENT
   b. Else (birth year present and same, different day/month OK): Label=PLAUSIBLE
3. Else (given names are present and match):
   a. If birth years are present (not inferred) and too far apart: Label=DIFFERENT
   b. If birth years empty, inferred, or match but day/month differ
      i. If no additional matching scope (surname or birth state, surname can be inferred): Label=PLAUSIBLE
      ii. If difference in either surname or birth state (different birth city is OK): Label=PLAUSIBLE
      iii. Else: Label=SAME
   c. Else (birth years match or close enough, no difference in birth day/month):
      i. If difference in both surname and birth state (different birth city is OK): Label=PLAUSIBLE
      ii. Else: Label=SAME In the example decision tree above, "far apart" may be a predetermined value or range, such as 10 years, 20 years, etc., and "close enough" may be a predetermined value or range, such as 1 year, 3 years, etc.

The provision of such test sets advantageously facilitates the identification and rectification of weak areas, particularly when utilizing machine-learned modalities in entity-resolution techniques. Machine-learned weights, for example, are generated using a black-box process that does not allow a developer to understand how the weights have been judged and determined. In addition, in complex tasks like genealogical entity resolution, where many nuanced features are compared to classify a pair of entities, it can be difficult to discern which weights need to be adjusted in response to a model generating absurd results.

Providing internal consistency-check test sets according to the disclosed embodiments allows for diagnosing a model that lacks requisite internal consistency in a particular area. For instance, a test set such as is described above in Table 4 allows for testing whether a particular pair of entities are being classified by the entity-resolution engine in a sensible manner, e.g. in a manner that makes intuitive sense to a professional genealogist. To the extent that the entities are not being classified in a sensible manner, running the test sets through the entity-resolution engine show the particular variables that are aberrant and that call for further training, modifications, rules, or otherwise.

Figure 9:
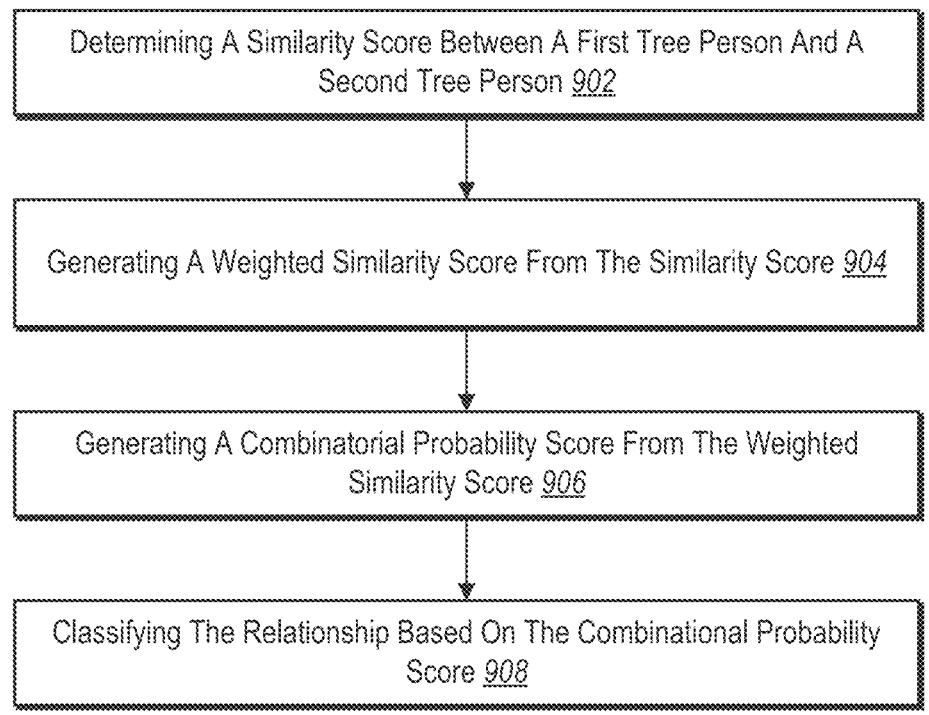
FIG. 9 illustrates an example method flow for classifying a relationship based on a combinatorial probability score in accordance with one or more embodiments.

FIG. 9 illustrates acts according to certain implementations, and alternative implementations may omit, add to, reorder, and/or modify any of the acts shown in FIG. 9. The acts of FIG. 9 can be performed as part of a method. Alternatively, a non-transitory computer-readable medium can comprise instructions, that when executed by one or more processors, cause a computing device to perform the acts of FIG. 9. In still further implementations, a system can perform the acts of FIG. 9.

As shown, the series of acts 900 can include an act 902 of determining a similarity score between a first tree person and a second tree person. In particular, the act 902 can involve determining a similarity score between a first tree person and a second tree person based on comparing a first set of tree data for the first tree person and a second set of tree data for a second tree person. In addition, the series of acts 900 can include an act 904 of generating weighted similarity score from the similarity score. For example, the act 904 can involve generating a weighted similarity score from the similarity score by applying weights to one or more score components that make up the similarity score. As shown, the series of acts 900 can also include an act 906 of generating a combinatorial probability score from the weighted similarity score. For example, the act 906 can involve generating a combinatorial probability score from the weighted similarity score based on probabilities associated with the first set of tree data and the second set of tree data. As also shown, the series of acts 900 can include an act 908 of classifying a relationship based on the combinatorial probability score. For instance, the act 908 can involve classifying a relationship between the first tree person and the second tree person based on the combinatorial probability score.

In some embodiments, the series of acts 900 includes an act of modifying a genealogical database storing the first set of tree data and the second set of tree data based on classifying the relationship between the first tree person and the second tree person. In addition, the series of acts 900 can include an act of determining the similarity score by comparing a first data field of the first set of tree data and a second data field of the second set of tree data to determine the one or more score components. The score components can include a matching score component indicating a degree to which the first data field and the second data field reflect matching data, a different score component indicating a degree to which the first data field and the second data field reflect different data, and a lacking score component indicating a degree to which one or more of the first data field or the second data field reflect lacking data.

In one or more embodiments, the series of acts 900 includes an act of generating the weighted similarity score by utilizing a tree data weighting machine learning model to determine, for a plurality of data fields, weights for the one or more score components that make up the similarity score. In addition, the series of acts 900 can include an act of generating the combinatorial probability score by determining a probability of real-world occurrence for data within one or more of the first set of tree data or the second set of tree data and modifying a weight within the weighted similarity score based on the probability of real-world occurrence for the data. Further, the series of acts 900 can include an act of classifying the relationship between the first tree person and the second tree person by selecting a classification from among a set of classifications comprising a same classification, a different classification, and a plausible classification. In addition, the series of acts 900 can include an act of selecting the classification b by comparing the combinatorial probability score with at least one sameness threshold corresponding to the set of classifications to determine which of the set of classifications corresponds to the combinatorial probability score. In some cases, the series of acts 900 includes an act of generating a combinatorial probability score from the weighted similarity score by: determining a probability of real-world occurrence for data within one or more of the first set of tree data or the second set of tree data and modifying a weight within the weighted similarity score based on the probability of real-world occurrence for the data.

In addition, the series of acts 900 can include an act of, based on classifying the relationship between the first tree person and the second tree person, modifying a genealogical database storing the first set of tree data and the second set of tree data by combining the first tree person and the second tree person into a single entity. Further, the series of acts 900 can include an act of determining the similarity score by: determining data fields associated with the first tree person and the second tree person from the second set of tree data from the first set of tree data and the second set of tree data, determining additional data fields associated with relatives of the first tree person and relatives of the second tree person from the first set of tree data and the second set of tree data, and comparing the data fields and the additional data fields for the first tree person and the second tree person.

In one or more embodiments, the series of acts 900 includes an act of generating the weighted similarity score by utilizing a tree data weighting machine learning model to determine weights for the one or more score components across a plurality of data fields within the first set of tree data and the second set of tree data. Further, the series of acts 900 can include an act of determining the one or more score components by determining: a matching score component indicating a degree to which a first data field from the first set of tree data and a second data field from the second set of tree data reflect matching data, a different score component indicating a degree to which the first data field and the second data field reflect different data, and a lacking score component indicating a degree to which one or more of the first data field or the second data field reflect lacking data.

In some embodiments, the series of acts 900 includes an act of determining the similarity score by combining the matching score component, the different score component, and the lacking score component. Additionally, the series of acts 900 includes an act of generating the combinatorial probability score by: determining a probability of real-world occurrence for data within one or more of the first set of tree data or the second set of tree data, and modifying a weight within the weighted similarity score based on the probability of real-world occurrence for the data. Further, the series of acts 900 includes an act of generating a weighted similarity score from the similarity score by utilizing the tree data weighting machine learning model to determine weights for one or more score components that make up the similarity score. The series of acts 900 can also include an act of generating a combinatorial probability score from the weighted similarity score based on probabilities associated with the first set of tree data and the second set of tree data.

In one or more embodiments, the series of acts 900 includes an act of modifying a genealogical database storing the first set of tree data and the second set of tree data based on classifying the relationship between the first tree person and the second tree person. In addition, the series of acts 900 includes an act of generating the weighted similarity score by weighting the one or more score components to reflect respective probative values of the one or more score components. Further, the series of acts 900 can include an act of generating the weighted similarity score by weighting data fields to reflect respective probative values of the data fields, wherein the data fields include a life range data field indicating a possibly living range for a corresponding tree person based on life events of the corresponding tree person.

In some embodiments, the series of acts 900 includes an act of determining the similarity score by comparing a first data field of the first set of tree data and a second data field of the second set of tree data to determine the one or more score components including: a matching score component indicating a degree to which the first data field and the second data field reflect matching data, a different score component indicating a degree to which the first data field and the second data field reflect different data, and a lacking score component indicating a degree to which one or more of the first data field or the second data field reflect lacking data. Additionally, the series of acts 900 includes an act of generating the combinatorial probability score by: determining a probability of real-world occurrence for data within one or more of the first set of tree data or the second set of tree data, and modifying a weight within the weighted similarity score based on the probability of real-world occurrence for the data.

Figure 10:
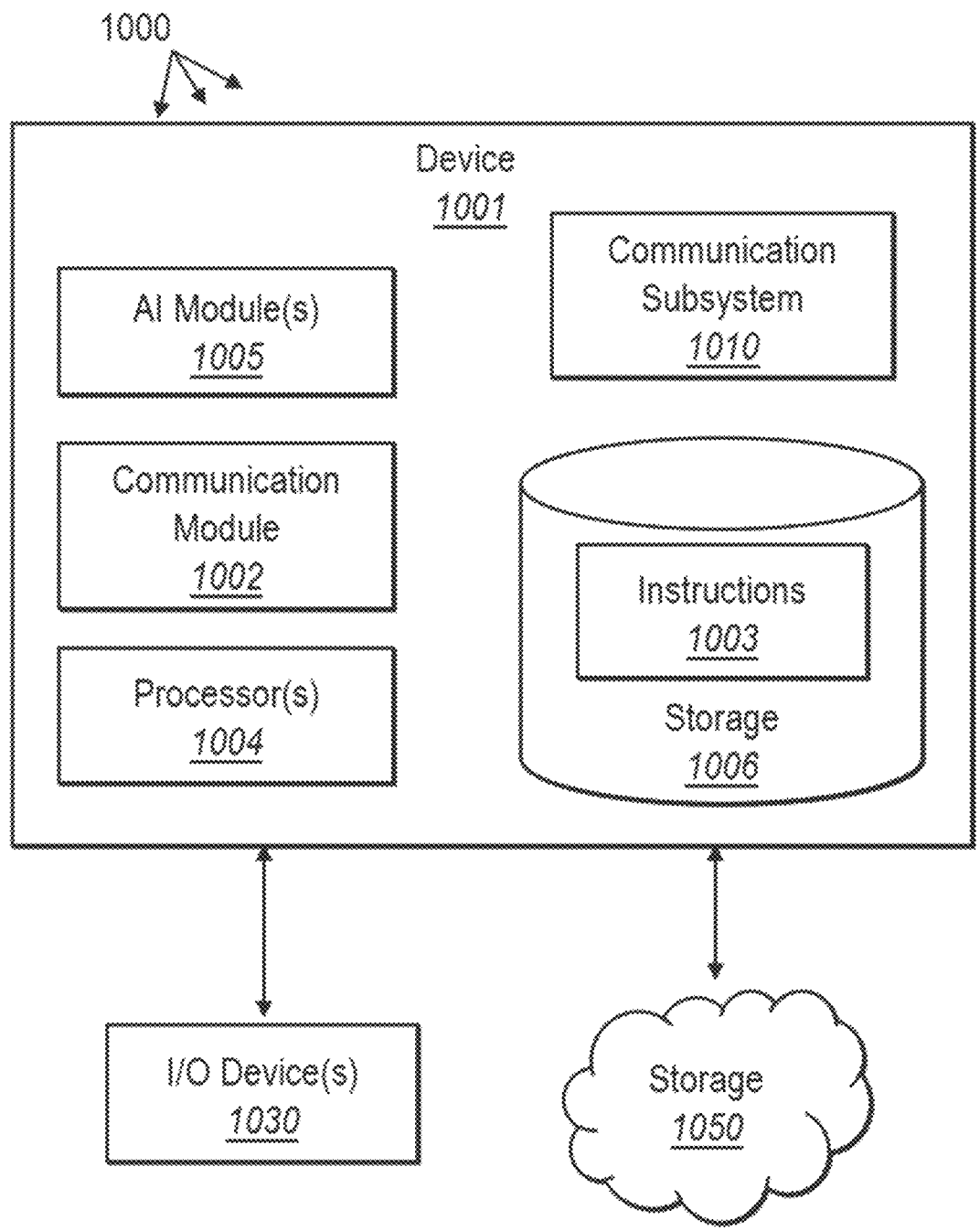
FIG. 10 illustrates a block diagram of an example computer system in accordance with one or more embodiments.

FIG. 10 illustrates an example computer system 1000 comprising various hardware elements, in accordance with some embodiments of the present disclosure. The computer system 1000 may be incorporated into or integrated with devices described herein and/or may be configured to perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

In the illustrated example, the computer system 1000 includes a device 1001, a cloud storage 1050, and input and/or output device(s) 1030. The device 1001 includes a communication module 1002, one or more processor(s) 1004, one or more artificial intelligence (AI) module(s) 1005, a communication subsystem 1010, and a storage 1006 comprising instructions 1003 for implementing an entity-resolution system and/or method according to the disclosure. The computer system 1000 may be implemented using various hardware implementations and embedded system technologies. For example, one or more elements of the computer system 1000 (or the device 1001) may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of the computer system 1000 may be communicatively coupled via the communication module 1002. While the communication module 1002 is illustrated as a single connection for purposes of clarity, it should be understood that the communication module 1002 may include various numbers and types of communication media for transferring data between pertinent components such as hardware elements. For example, the communication module 1002 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, the communication module 1002 may include one or more buses connecting pins of the hardware elements of the computer system 1000. For example, the communication module 1002 may include a bus that connects the processor(s) 1004 with the storage 1006, referred to as a system bus, and a bus that connects the storage 1006 with the input device(s) and/or output device(s) 1030, referred to as an expansion bus. The system bus may itself consist of several buses, including an address bus, a data bus, and a control bus. The address bus may carry a memory address from the processor(s) 1004 to the address bus circuitry associated with the storage 1006 in order for the data bus to access and carry the data contained at the memory address back to the processor(s) 1004. The control bus may carry commands from the processor(s) 1004 and return status signals from the storage 1006. Each bus may include multiple wires for carrying multiple bits of information and each bus may support serial or parallel transmission of data.

The processor(s) 1004 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. The processor(s) 1004 may include one or more multi-core processors, in which each core may read and execute program instructions concurrently with the other cores, increasing speed for programs that support multithreading.

The input device(s) 1030 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. The input device(s) 1030 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

The output device(s) 1030 may include one or more of various devices that convert information into human-readable form, such as without limitation a display device, a speaker, a printer, a haptic or tactile device, and/or the like. The output device(s) 1030 may also include devices for writing to removable storage devices or other removable media, such as those described in reference to the input device(s). The output device(s) 1030 may also include various actuators for causing physical movement of one or more components. Such actuators may be hydraulic, pneumatic, electric, and may be controlled using control signals generated by the computer system 1000.

The communications subsystem 1010 may include hardware components for connecting the computer system 1000 to systems or devices that are located external to the computer system 1000, such as over a computer network. In various embodiments, the communications subsystem 1010 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 502.11 device, a Wi-Fi device, a Wi-Max device, a cellular device), combinations thereof, or other suitable possibilities.

The storage 1006 may include the various data storage devices of the computer system 1000. For example, the storage 1006 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While the processor(s) 1004 and the storage 1006 are illustrated as being separate elements, it should be understood that the processor(s) 1004 may include varying levels of on-processor memory, such as processor registers and caches that may be utilized by a single processor or shared between multiple processors.

The storage 1006 may include a main memory, which may be directly accessible by the processor(s) 1004 via the memory bus of the communication module 1002. For example, the processor(s) 1004 may continuously read and execute instructions stored in the main memory. As such, various software elements may be loaded into the main memory so as to be read and executed by the processor(s) 1004 as illustrated in FIG. 10. Typically, the main memory is volatile memory, which loses all data when power is turned off and accordingly needs power to preserve stored data.

The main memory may further include a small portion of non-volatile memory containing software (e.g., firmware, such as BIOS) that is used for reading other software stored in the storage 1006 into the main memory. In some embodiments, the volatile memory of the main memory is implemented as RAM, such as dynamic random-access memory (DRAM), and the non-volatile memory of the main memory is implemented as read-only memory (ROM), such as flash memory, erasable programmable read-only memory (EPROM), or electrically erasable programmable read-only memory (EEPROM).

The computer system 1000 may include software elements, shown as being currently located within the main memory, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1003, which are executable by the computer system 1000. In one example, such instructions 1003 may be received by the computer system 1000 using the communications subsystem 1010 (e.g., via a wireless or wired signal that carries the instructions 1003), carried by the communication module 1002 to the storage 1006, stored within the storage 1006, read into the main memory, and executed by the processor(s) 1004 to perform one or more steps of the described methods.

In another example, the instructions 1003 may be received by the computer system 1000 using the input device(s) 1030 (e.g., via a reader for removable media), carried by the communication module 1002 to the storage 1006, stored within the storage 1006, read into the main memory, and executed by the processor(s) 1004 to perform one or more steps of the described methods.

In some embodiments of the present disclosure, the instructions 1003 are stored on a computer-readable storage medium (or simply computer-readable medium). Such a computer-readable medium may be a hardware storage device that, compared to transmission media or carrier waves, is "non-transitory" and may therefore be referred to as a non-transitory computer-readable medium. In some cases, the non-transitory computer-readable medium may be incorporated within the computer system 1000. For example, the non-transitory computer-readable medium may be the storage 1006 and/or the cloud storage 1050 (as shown in FIG. 10).

In some cases, the non-transitory computer-readable medium may be separate from the computer system 1000. In one example, the non-transitory computer-readable medium may be a removable medium provided to the input device(s) 1030, such as those described in reference to the input device(s) 1030, with the instructions 1003 being read into the computer system 1000 from the input device(s) 1030. In another example, the non-transitory computer-readable medium may be a component of a remote electronic device, such as a mobile phone, that may wirelessly transmit a data signal that carries the instructions 1003 to the computer system 1000 and that is received by the communications subsystem 1010.

The instructions 1003 may take any suitable form to be read and/or executed by the computer system 1000. For example, the instructions 1003 may be source code (written in a human-readable programming language such as Java, C, C++, C #, Python), object code, assembly language, machine code, microcode, executable code, and/or the like. In one example, the instructions 1003 are provided to the computer system 1000 in the form of source code, and a compiler is used to translate the instructions 1003 from source code to machine code, which may then be read into the main memory for execution by the processor(s) 1004.

As another example, instructions 1003 are provided to the computer system 1000 in the form of an executable file with machine code that may immediately be read into the main memory for execution by processor(s) 1004. In various examples, the instructions 1003 may be provided to the computer system 1000 in encrypted or unencrypted form, compressed or uncompressed form, as an installation package or an initialization for a broader software deployment, among other possibilities.

In one aspect of the present disclosure, a system (e.g., the computer system 1000) is provided to perform methods in accordance with various embodiments of the present disclosure. For example, some embodiments may include a system comprising one or more processors (e.g., the processor(s) 1004) that are communicatively coupled to a non-transitory computer-readable medium (e.g., the storage 1006). The non-transitory computer-readable medium may have instructions (e.g., the instructions 1003) stored thereon that, when executed by the one or more processors, cause the one or more processors to perform the methods or aspects thereof as described in the various embodiments.

In another aspect of the present disclosure, a computer-program product that includes instructions (e.g., instructions 1003) is provided to perform methods in accordance with various embodiments of the present disclosure. The computer-program product may be tangibly embodied in a non-transitory computer-readable medium (e.g., the storage 1006). The instructions may be configured to cause one or more processors (e.g., the processor(s) 1004) to perform the methods or aspects thereof as described in the various embodiments.

In another aspect of the present disclosure, a non-transitory computer-readable medium (e.g., the storage 1006) is provided. The non-transitory computer-readable medium may have instructions (e.g., instructions 1003) stored thereon that, when executed by one or more processors (e.g., processor(s) 1004), cause the one or more processors to perform the methods or aspects thereof as described in the various embodiments.

By providing a system, method, and/or computer-program product for entity-resolution for genealogical databases, the problem of existing entity-resolution techniques being poorly adapted to recognizing and discerning nuanced and challenging cases, which arise particularly in genealogical contexts, given the numerous factors that make accurate comparisons notoriously difficult to perform, is advantageously addressed. The entity-resolution embodiments of the disclosure advantageously facilitate improved detection, resolution, and transformation of individual entities by reducing computation and revision costs as well as reducing errors by providing a novel approach for determining probabilities of particular combinations.

It is to be understood that not necessarily all objects or advantages may be achieved under any embodiment of the disclosure. Those skilled in the art will recognize that the entity-resolution system, computer program product, and/or method embodiments may be embodied or carried out, so they achieve or optimize one advantage or group of advantages as taught herein without necessarily achieving other objects or advantages as taught or suggested herein.

The skilled artisan will recognize the interchangeability of various disclosed features. Besides the variations described, other known equivalents for each feature can be mixed and matched by one of skill in this art to provide or utilize an entity-resolution system, computer program product, and/or method under principles of the present disclosure. It will be understood by the skilled artisan that the features described may apply to other types of data, contexts, and/or models.

Although this disclosure describes certain exemplary embodiments and examples of an entity-resolution system, computer program product, and/or method, it nevertheless will be understood by those skilled in the art that the present disclosure extends beyond the specifically disclosed embodiments to other alternative embodiments and/or uses of the disclosure and obvious modifications and equivalents thereof. It is intended that the scope of the present disclosure should not be limited by the particular disclosed embodiments described above, and may be extended to other uses, approaches, and contexts of family tree-, genealogy-, and/or genetic-related applications.

What is claimed is:

1. A computer-implemented method comprising:
    determining, for a first tree person and a second tree person corresponding to respective nodes of genealogical trees within a tree database, a similarity score between the first tree person and the second tree person based on comparing a first set of tree data for the first tree person and a second set of tree data for the second tree person;
    generating a weighted similarity score from the similarity score by applying weights to one or more score components that make up the similarity score;
    generating a combinatorial probability score from the weighted similarity score based on probabilities associated with the first set of tree data and the second set of tree data;
    classifying a relationship between the first tree person and the second tree person based on the combinatorial probability score; and
    modifying, within a cluster database storing genealogical records clustered according to respective tree persons, a clustered entity according to the relationship between the first tree person and the second tree person.

2. The computer-implemented method of claim 1, further comprising modifying the clustered entity within the cluster database storing the first set of tree data and the second set of tree data based on classifying the relationship between the first tree person and the second tree person by combining the first set of tree data corresponding to the first tree person and the second set of tree data corresponding to the second tree person into the clustered entity.

3. The computer-implemented method of claim 1, wherein determining the similarity score comprises comparing a first data field of the first set of tree data and a second data field of the second set of tree data to determine the one or more score components comprising:
    a matching score component indicating a degree to which the first data field and the second data field reflect matching data;
    a different score component indicating a degree to which the first data field and the second data field reflect different data; and
    a lacking score component indicating a degree to which one or more of the first data field or the second data field reflect lacking data.

4. The computer-implemented method of claim 1, wherein generating the weighted similarity score comprises utilizing a tree data weighting machine learning model to determine, for a plurality of data fields, weights for the one or more score components that make up the similarity score.

5. The computer-implemented method of claim 1, wherein generating the combinatorial probability score comprises:
    determining a probability of real-world occurrence for data within one or more of the first set of tree data or the second set of tree data; and
    modifying a weight within the weighted similarity score based on the probability of real-world occurrence for the data.

6. The computer-implemented method of claim 1, wherein classifying the relationship between the first tree person and the second tree person comprises selecting a classification from among a set of classifications comprising a same classification, a different classification, and a plausible classification.

7. The computer-implemented method of claim 6, wherein selecting the classification comprises comparing the combinatorial probability score with at least one sameness threshold corresponding to the set of classifications to determine which of the set of classifications corresponds to the combinatorial probability score.

8. A non-transitory computer readable medium storing instructions which, when executed by at least one processor, cause the at least one processor to:
    determine, for a first tree person and a second tree person corresponding to respective nodes of genealogical trees within a tree database a similarity score between the first tree person and the second tree person based on comparing a first set of tree data for the first tree person and a second set of tree data for the second tree person;
    generate a weighted similarity score from the similarity score by applying weights to one or more score components that make up the similarity score;
    generate a combinatorial probability score from the weighted similarity score by:
        determining a probability of real-world occurrence for data within one or more of the first set of tree data or the second set of tree data; and modifying a weight within the weighted similarity score based on the probability of real-world occurrence for the data;

classify a relationship between the first tree person and the second tree person based on the combinatorial probability score; and modify, within a cluster database storing genealogical records clustered according to respective tree persons, a clustered entity according to the relationship between the first tree person and the second tree person.

9. The non-transitory computer readable medium of claim 8, further comprising instructions that, when executed by the at least one processor, cause the at least one processor to, based on classifying the relationship between the first tree person and the second tree person, modify the clustered entity within the cluster database by combining the first set of tree data corresponding to the first tree person and the second set of tree data corresponding to the second tree person into the clustered entity.

10. The non-transitory computer readable medium of claim 8, wherein the instructions, when executed by the at least one processor, cause the at least one processor to determine the similarity score by:

determining data fields associated with the first tree person and the second tree person from the second set of tree data from the first set of tree data and the second set of tree data;

determining additional data fields associated with relatives of the first tree person and relatives of the second tree person from the first set of tree data and the second set of tree data; and comparing the data fields and the additional data fields for the first tree person and the second tree person.

11. The non-transitory computer readable medium of claim 8, wherein the instructions, when executed by the at least one processor, cause the at least one processor to generate the weighted similarity score by utilizing a tree data weighting machine learning model to determine weights for the one or more score components across a plurality of data fields within the first set of tree data and the second set of tree data.

12. The non-transitory computer readable medium of claim 8, further comprising instructions that, when executed by the at least one processor, cause the at least one processor to determine the one or more score components by determining:

a matching score component indicating a degree to which a first data field from the first set of tree data and a second data field from the second set of tree data reflect matching data;

a different score component indicating a degree to which the first data field and the second data field reflect different data; and a lacking score component indicating a degree to which one or more of the first data field or the second data field reflect lacking data.

13. The non-transitory computer readable medium of claim 12, wherein the instructions, when executed by the at least one processor, cause the at least one processor to determine the similarity score by combining the matching score component, the different score component, and the lacking score component.

14. The non-transitory computer readable medium of claim 8, wherein the instructions, when executed by the at least one processor, cause the at least one processor to generate the combinatorial probability score by:

determining a probability of real-world occurrence for data within one or more of the first set of tree data or the second set of tree data; and modifying a weight within the weighted similarity score based on the probability of real-world occurrence for the data.

15. A system comprising:

one or more memory devices comprising a tree data weighting machine learning model; and one or more processors configured to cause the system to:

determine, for a first tree person and a second tree person corresponding to respective nodes of genealogical trees within a tree database, a similarity score between the first tree person and the second tree person based on comparing a first set of tree data for the first tree person and a second set of tree data for the second tree person;

generate a weighted similarity score from the similarity score by utilizing the tree data weighting machine learning model to determine weights for one or more score components that make up the similarity score;

generate a combinatorial probability score from the weighted similarity score based on probabilities associated with the first set of tree data and the second set of tree data;

classify a relationship between the first tree person and the second tree person based on the combinatorial probability score; and modify, within a cluster database storing genealogical records clustered according to respective tree persons, a clustered entity according to the relationship between the first tree person and the second tree person.

16. The system of claim 15, wherein the one or more processors are configured to cause the system to modify the clustered entity within the cluster database storing the first set of tree data and the second set of tree data based on classifying the relationship between the first tree person and the second tree person by combining the first set of tree data corresponding to the first tree person and the second set of tree data corresponding to the second tree person into the clustered entity.

17. The system of claim 15, wherein the one or more processors are configured to cause the system to generate the weighted similarity score by weighting the one or more score components to reflect respective probative values of the one or more score components.

18. The system of claim 15, wherein the one or more processors are configured to cause the system to generate the weighted similarity score by weighting data fields to reflect respective probative values of the data fields, wherein the data fields include a life range data field indicating a possibly living range for a corresponding tree person based on life events of the corresponding tree person.

19. The system of claim 15, wherein the one or more processors are configured to cause the system to determine the similarity score by comparing a first data field of the first set of tree data and a second data field of the second set of tree data to determine the one or more score components comprising:

a matching score component indicating a degree to which the first data field and the second data field reflect matching data;

a different score component indicating a degree to which the first data field and the second data field reflect different data; and a lacking score component indicating a degree to which one or more of the first data field or the second data field reflect lacking data.

20. The system of claim 15, wherein generating the combinatorial probability score comprises:
determining a probability of real-world occurrence for data within one or more of the first set of tree data or the second set of tree data; and
modifying a weight within the weighted similarity score based on the probability of real-world occurrence for the data.

* * * * *